(12) United States Patent
Kozaki

(10) Patent No.: US 10,260,559 B2
(45) Date of Patent: Apr. 16, 2019

(54) MOTOR DRIVING DEVICE AND VACUUM PUMP

(71) Applicant: SHIMADZU CORPORATION, Kyoto (JP)

(72) Inventor: Junichiro Kozaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 440 days.

(21) Appl. No.: 14/137,891

(22) Filed: Dec. 20, 2013

(65) Prior Publication Data

US 2014/0210385 A1    Jul. 31, 2014

(30) Foreign Application Priority Data

Jan. 28, 2013    (JP) .................................. 2013-013295

(51) Int. Cl.
    *H02P 23/20*    (2016.01)
    *H02P 1/28*     (2006.01)
    (Continued)

(52) U.S. Cl.
    CPC ........ *F16C 32/0457* (2013.01); *F04D 19/042* (2013.01); *F04D 19/048* (2013.01);
    (Continued)

(58) Field of Classification Search
    CPC .................................. H02P 23/20; H02P 1/28
    (Continued)

(56) References Cited

U.S. PATENT DOCUMENTS 5,345,155 A * 9/1994 Masaki ............... B60L 11/1803
                                                     318/400.07
5,436,544 A * 7/1995 Matsubara ............ H02P 25/024
                                                        318/719
(Continued)

FOREIGN PATENT DOCUMENTS

CN            1675469 A       9/2005
CN          101230858 A       7/2008
(Continued)

OTHER PUBLICATIONS

English translation of Chinese Office Action dated Feb. 15, 2017 for corresponding Chinese Application No. 201310671260.7.

(Continued)

*Primary Examiner* — Jorge L Carrasquillo
*Assistant Examiner* — Cortez M Cook
(74) *Attorney, Agent, or Firm* — Renner Otto Boisselle & Sklar, LLP

(57) ABSTRACT

A motor driving device comprises a first arithmetic section calculating a rotational speed and a magnetic pole electrical angle of a motor rotor, a current command setting section setting a d-axis current command and a q-axis current command in a rotating coordinate dq system based on a difference between the rotational speed and a target rotational speed, a driving command generating section generating a sinusoidal wave driving command based on the d-axis current command, the q-axis current command, the rotational speed and the magnetic pole electrical angle and a PWM signal generating section. When the rotational speed has a positive value indicating a positive rotational state, the current command setting section sets the q-axis current command of acceleration driving, and when the rotational speed has a negative value indicating a reverse rotational (Continued)

state, the current command setting section sets the q-axis current command of deceleration driving.

15 Claims, 13 Drawing Sheets

(51) Int. Cl.
*F16C 32/04* (2006.01)
*F04D 29/058* (2006.01)
*H02P 6/182* (2016.01)
*F04D 19/04* (2006.01)
*H02P 21/24* (2016.01)
*H02P 21/36* (2016.01)

(52) U.S. Cl.
CPC .......... *F04D 29/058* (2013.01); *H02P 6/182* (2013.01); *H02P 21/24* (2016.02); *H02P 21/36* (2016.02); *F16C 2360/45* (2013.01)

(58) Field of Classification Search
USPC .................. 318/432, 795, 802; 388/811
See application file for complete search history.

(56) References Cited

U.S. PATENT DOCUMENTS

| | | | | |
|---|---|---|---|---|
| 5,940,576 | A * | 8/1999 | de Simon | F04D 19/04 318/400.27 |
| 5,959,429 | A * | 9/1999 | Tajima | H02P 21/09 318/799 |
| 2004/0201358 | A1 * | 10/2004 | Kawaji | H02P 25/092 318/701 |
| 2005/0052146 | A1 * | 3/2005 | Someya | H02P 1/28 318/434 |
| 2005/0174087 | A1 * | 8/2005 | Ueyama | F16C 32/0455 318/802 |
| 2006/0198735 | A1 | 9/2006 | Iijima et al. | |
| 2007/0103105 | A1 * | 5/2007 | Endo | B62D 5/046 318/432 |
| 2008/0080984 | A1 | 4/2008 | Tanigawa et al. | |
| 2008/0169783 | A1 * | 7/2008 | Yamamoto | H02P 21/16 318/802 |
| 2009/0212728 | A1 * | 8/2009 | Yagi | B60L 11/1803 318/437 |
| 2009/0237026 | A1 * | 9/2009 | Panaitescu | G05B 19/404 318/630 |

FOREIGN PATENT DOCUMENTS

| | | | |
|---|---|---|---|
| JP | 2003-259679 | | 9/2003 |
| JP | 2004138047 A | * | 5/2004 |
| JP | 2009-284627 A | | 12/2009 |
| JP | 2010-088232 A | | 4/2010 |
| JP | 4692891 | | 6/2011 |
| JP | 2011-226399 | | 11/2011 |
| JP | 2012-120268 A | | 6/2012 |
| JP | 2013042630 A | * | 2/2013 |
| WO | WO 2013018209 A1 | * | 2/2013 ............. B60L 3/003 |

OTHER PUBLICATIONS

English translation of Chinese Office Action dated Jan. 4, 2016 for corresponding Chinese Application No. 201310671260.7.
Wenqi et al., "The Control System Design of Freezer Compressor Based on Vector Frequency Technology", Compressor Technology, No. 5, May 2010 and English abstract.
English translation of Japanese Office Action dated Apr. 4, 2017 for corresponding Japanese Application No. 2013-013295.
English translation of Chinese Office Action dated Aug. 10, 2016 for corresponding Chinese Application No. 201310671260.7.
English translation of Japanese Office Action dated Aug. 30, 2016 for corresponding Japanese Application No. 2013-013295.

* cited by examiner (a) ω>0

(b) ω<0

(a)

(b)

MOTOR DRIVING DEVICE AND VACUUM PUMP

BACKGROUND OF THE INVENTION

1. Field of the Invention

The present invention relates to a motor driving device for a vacuum pump, and a vacuum pump having the motor driving device.

2. Description of the Related Art

Axial vacuum pumps such as turbo molecular pumps rotate rotors having a rotor blade at a high-speed for evacuation. At this time, since exhaust is carried out while rarefied gas is being compressed, the rotors move only in one direction (this rotational direction is positive rotation). Therefore, the axial vacuum pumps normally accelerate and decelerate between a stationary state and a positive rotation region, and steadily rotate in the positive rotation.

Conventionally, as information necessary for motor driving for rotating rotors, rotational speed information and magnetic pole positional information about motor rotors are obtained based on detection signals of rotation sensors. For example, in a vacuum pump that detects targets (having gaps) provided to rotors by inductance type gap sensors, it is difficult to detect the rotational direction using only the rotation sensors. For this reason, normally, the above problem is handled by devising a control sequence in the motor driving (particularly, at a start time when reverse rotation likely occurs) (for example, see JP 4692891 B).

However, when the rotation of the rotors is started from the stationary state (activated), the reverse rotation occasionally occurs at an excitation start time, and the control sequence is devised, but instead the activating time is lengthened.

Further, when an axial vacuum pump such as a turbo molecular pump is mounted to a large vacuum chamber and the chamber is quickly returned from the vacuum state to an atmospheric pressure state, the atmospheric pressure state is gained while gas is counter-flowing from a pump side to a chamber side. For this reason, a rotor infrequently rotates in a reverse manner due to a function of gaseous regurgitation. In such a case, in order to prevent activation in the reversely rotating state, the pump should wait for starting of reactivation between the reversely rotating state and stationary state of the rotor.

SUMMARY OF THE INVENTION

A motor driving device for a vacuum pump comprises: an inverter for driving a motor, the inverter having a plurality of switching elements; a first arithmetic section for calculating a rotational speed and a magnetic pole electrical angle of a motor rotor based on information about motor phase voltage and information about motor phase current; a current command setting section for setting a d-axis current command and a q-axis current command in a rotating coordinate dq system based on a difference between the rotational speed and a target rotational speed; a driving command generating section for generating a sinusoidal wave driving command based on the d-axis current command, the q-axis current command, the rotational speed and the magnetic pole electrical angle; and a PWM signal generating section for generating a PWM control signal for controlling on/off of the plurality of switching elements based on the sinusoidal wave driving command. At the time of pump startup, when the rotational speed has a positive value indicating a positive rotational state, the current command setting section sets the q-axis current command of acceleration driving, and when the rotational speed has a negative value indicating a reverse rotational state, the current command setting section sets the q-axis current command of deceleration driving.

Preferably the first arithmetic section includes a counter electromotive voltage arithmetic section for calculating a first counter electromotive voltage in a fixed coordinate αβ system based on the information about the motor phase voltage and the information about the motor phase current, a first converting section for receiving the magnetic pole electrical angle through feedback and converting the first counter electromotive voltage into a second counter electromotive voltage in the rotating coordinate dq system based on the magnetic pole electrical angle, a second arithmetic section for, when a vector phase angle of the second counter electromotive voltage is denoted by Ψ and the rotational speed has a positive value, calculating a magnetic pole phase error so that Ψ−π/2 converges to 0, and when the rotational speed has a negative value, calculating the magnetic pole phase error so that Ψ+π/2 converges to 0, a third arithmetic section for calculating the rotational speed based on the first counter electromotive voltage, and a fourth arithmetic section for calculating an integrated value of the rotational speed calculated by the third arithmetic section, the first arithmetic section outputs a sum of the magnetic pole phase error and the integrated value as the magnetic pole electrical angle. When the rotational speed has a negative value, the current command setting section sets the q-axis current command to a positive value so as to carry out deceleration driving.

Preferably the first arithmetic section includes a counter electromotive voltage arithmetic section for calculating a first counter electromotive voltage in a fixed coordinate αβ system based on the information about the motor phase voltage and the information about the motor phase current, a first converting section for receiving the magnetic pole electrical angle through feedback and converting the first counter electromotive voltage into a second counter electromotive voltage in the rotating coordinate dq system based on the magnetic pole electrical angle, a second arithmetic section for, when a vector phase angle of the second counter electromotive voltage is denoted by Ψ calculating a magnetic pole phase error so that Ψ−π/2 converges to 0, a third arithmetic section for calculating the rotational speed based on the first counter electromotive voltage, and a fourth arithmetic section for calculating an integrated value of the rotational speed calculated by the third arithmetic section, the first arithmetic section outputs a sum of the magnetic pole phase error and the integrated value as the magnetic pole electrical angle. When the rotational speed has a negative value, the current command setting section sets the q-axis current command to a negative value so as to carry out deceleration driving.

Preferably the third arithmetic section includes a second converting section for receiving an electric angle calculated by sign-inverting the sum through feedback and converting the first counter electromotive voltage into a third counter electromotive voltage in the rotating coordinate dq system based on the electric angle, and a rotational speed arithmetic section for calculating the rotational speed based on a vector component phase of the second counter electromotive voltage and a vector component phase of the third counter electromotive voltage.

Preferably the rotational speed arithmetic section calculates the rotational speed based on an average value between a difference value of the vector component phase of the second counter electromotive voltage obtained at predetermined time intervals and a difference value of the vector component phase of the third counter electromotive voltage obtained at the predetermined time intervals.

Preferably the rotational speed arithmetic section obtains an average value between the vector component phase of the second counter electromotive voltage and the vector component phase of the third counter electromotive voltage at predetermined time intervals, and calculates the rotational speed based on a difference value between the average values obtained at the predetermined time intervals.

Preferably the third arithmetic section includes a third converting section for receiving an electric angle obtained by integrating the rotational speed through feedback and converting the first counter electromotive voltage into a fourth counter electromotive voltage in the rotating coordinate dq system based on the integrated value electrical angle, and the third arithmetic section calculates the rotational speed based on the vector component phase of the fourth counter electromotive voltage.

Preferably the third arithmetic section calculates the rotational speed based on the vector component phase of the first counter electromotive voltage calculated by the counter electromotive voltage arithmetic section.

Preferably the first arithmetic section includes a counter electromotive voltage arithmetic section for calculating counter electromotive voltage components $E\alpha$ and $E\beta$ in the fixed coordinate $\alpha\beta$ system based on the information about the motor phase voltage and the information about the motor phase current, a magnetic pole electrical angle arithmetic section for calculating the magnetic pole electrical angle based on the counter electromotive voltage components $E\alpha$ and $E\beta$, and a rotational speed arithmetic section for calculating the rotational speed based on the magnetic pole electrical angle calculated by the magnetic pole electrical angle arithmetic section. When the magnetic pole electrical angle is denoted by $\theta$ and the rotational speed fed back to be input from the rotational speed arithmetic section has a positive value, the magnetic pole electrical angle arithmetic section calculates the magnetic pole electrical angle according to $\theta=\tan^{-1}(-E\alpha/E\beta)$, and when the rotational speed fed back to be input from the rotational speed arithmetic section has a negative value, the magnetic pole electrical angle arithmetic section calculates the magnetic pole electrical angle according to $\theta=\tan^{-1}(E\alpha/-E\beta)$, and when the rotational speed has a negative value, the current command setting section sets the q-axis current command to a positive value so as to carry out deceleration driving.

Preferably the first arithmetic section includes a counter electromotive voltage arithmetic section for calculating counter electromotive voltage components $E\alpha$ and $E\beta$ in the fixed coordinate $\alpha\beta$ system based on the information about the motor phase voltage and the information about the motor phase current, a magnetic pole electrical angle arithmetic section for, when the magnetic pole electrical angle is denoted by $\theta$, calculating the magnetic pole electrical angle according to $\theta=\tan^{-1}(-E\alpha/E\beta)$, and a rotational speed arithmetic section for calculating the rotational speed based on the magnetic pole electrical angle calculated by the magnetic pole electrical angle arithmetic section. When the rotational speed has a negative value, the current command setting section sets the q-axis current command to a negative value so as to carry out deceleration driving.

A vacuum pump comprises a pump rotor formed with an exhaust function section; a motor for driving to rotate the pump rotor; and the motor driving device for a vacuum pump.

DETAILED DESCRIPTION OF PREFERRED EMBODIMENTS

Embodiments for carrying out the present invention are described below with reference to the drawings.

—First Embodiment—

Figure 1:
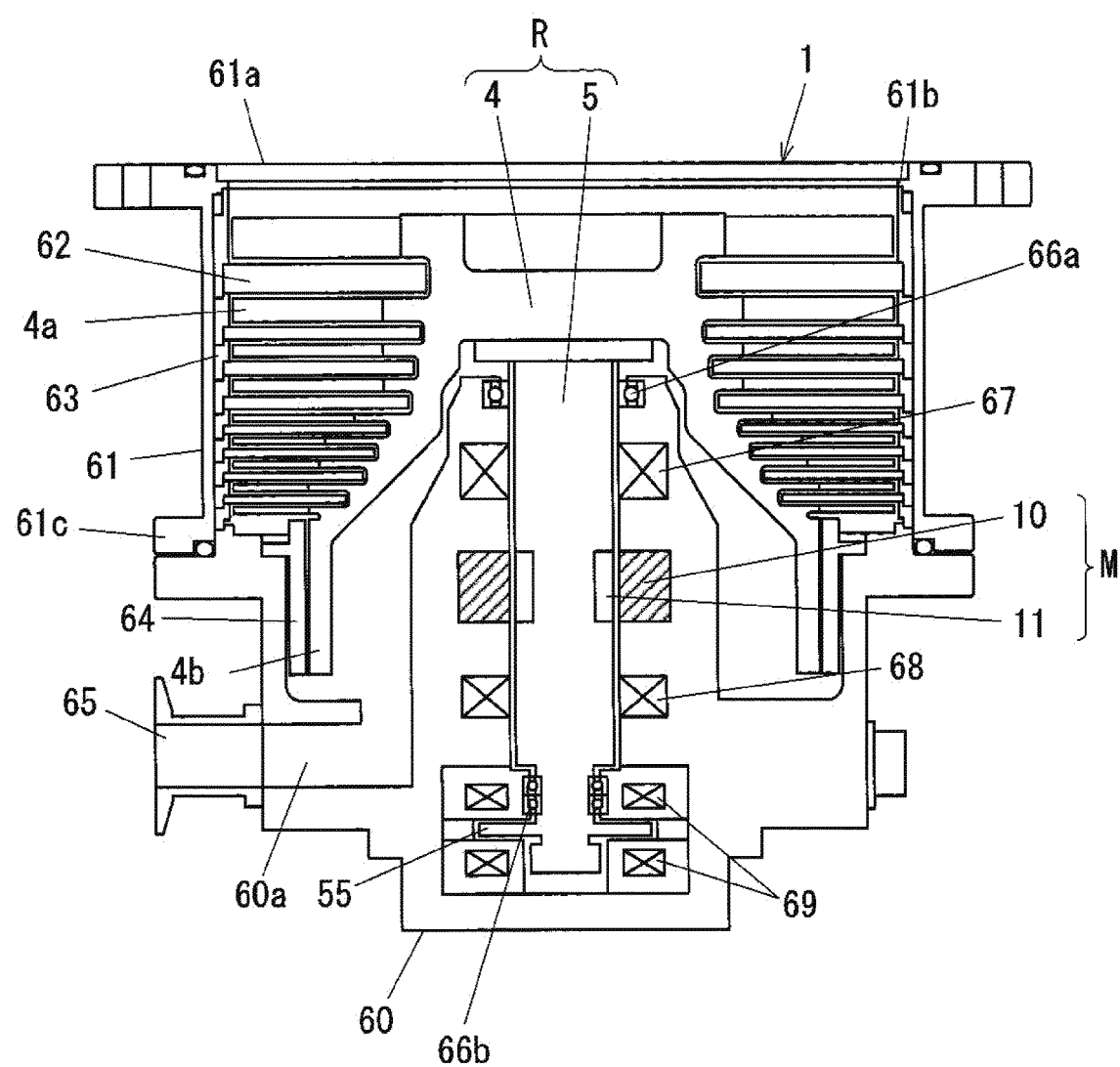
FIG. 1 is a diagram illustrating a constitution of a pump unit in a vacuum pump according to an embodiment.

FIG. 1 is a diagram illustrating a constitution of a pump unit 1 in a vacuum pump according to an embodiment. The vacuum pump has the pump unit 1 and a control unit (not show) for driving the pump unit 1 shown in FIG. 1. The vacuum pump shown in FIG. 1 is a magnetic levitation style turbo-molecular pump.

The pump unit 1 has a turbo pump stage composed of a rotor blade 4a and a fixed blade 62, and a drag pump stage (a thread groove pump) composed of a cylindrical section 4b and a screw stator 64. The thread groove is formed on the screw stator 64 side, but the thread groove may be formed on the cylindrical section 4b side. The rotor blade 4a and the cylindrical section 4b as a rotation-side evacuating function section are formed on a pump rotor 4. The pump rotor 4 is fastened to a shaft 5. The pump rotor 4 and the shaft 5 compose a rotor unit R.

A plurality of stages of the fixed blades 62 and the rotor blades 4a are arranged alternately in an axial direction. Each of the fixed blades 62 is placed on a base 60 via each spacer ring 63. When a fixed flange 61c of a pump case 61 is fixed to the base 60 by a bolt, the laminated spacer rings 63 are held between the base 60 and a locking section 61b of the pump case 61 so that the fixed blades 62 are located.

The shaft 5 is supported by magnetic bearings 67, 68 and 69 provided to the base 60 in a non-contact manner. Each of the magnetic bearings 67, 68 and 69 has an electromagnet and a displacement sensor. The displacement sensor detects a levitation position of the shaft 5. The electromagnet composing the magnetic bearing 69 in an axial direction is arranged so as to hold a rotor disc 55 that is provided to a lower end of the shaft 5 in the axial direction. The shaft 5 is driven to be rotated by a motor M.

The motor M is a synchronous motor, and for example, a permanent magnet synchronous motor is used. The motor M has a motor stator 10 arranged on the base 60, and a motor rotor 11 provided to the shaft 5. The motor rotor 11 is provided with a permanent magnet. When the magnetic bearings do not operate, the shaft 5 is supported by emergency mechanical bearings 66a and 66b.

An exhaust opening 60a of the base 60 is provided with an exhaust port 65, and a back pump is connected to the exhaust port 65. When the rotor unit R is magnetically levitated and is simultaneously driven to be rotated at a high speed by the motor M, gaseous molecules around a suction port 61a are exhausted to the exhaust port 65.

Figure 2:
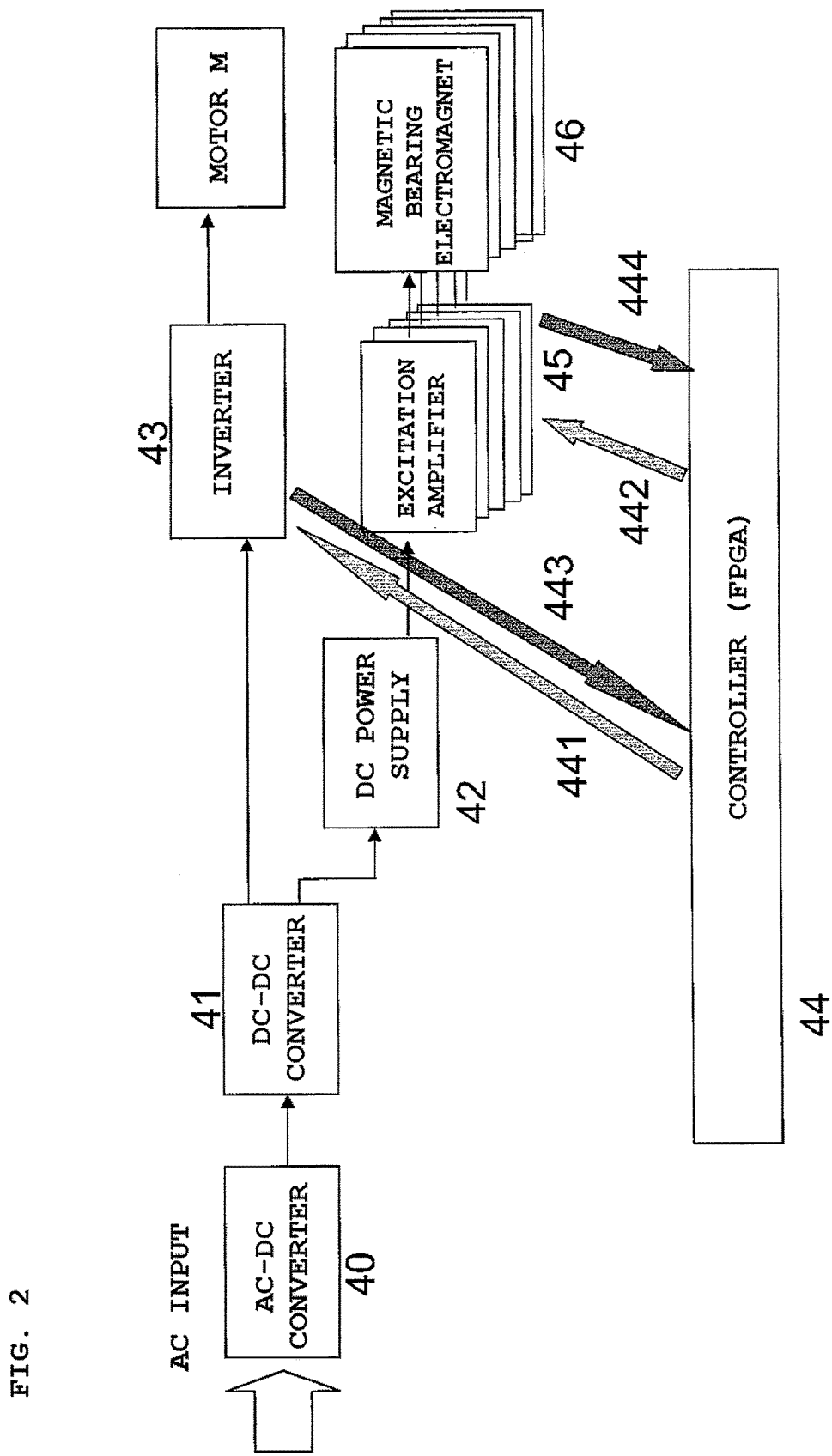
FIG. 2 is a block diagram illustrating a schematic constitution of a control unit.

FIG. 2 is a block diagram illustrating a schematic constitution of a control unit. An AC input from an outside is converted into a DC output (DC voltage) by an AC/DC converter 40 provided to the control unit. The DC voltage output from the AC/DC converter 40 is input into a DC/DC converter 41, and the DC/DC converter 41 generates the DC voltage for the motor M and the DC voltage for the magnetic bearings.

The DC voltage for the motor M is input into an inverter 43. The DC voltage for the magnetic bearings is input into a DC power supply 42 for the magnetic bearings. The magnetic bearings 67, 68 and 69 compose the five-axis magnetic bearing, each of the magnetic bearings 67 and 68 has two pairs of electromagnets 46, and the magnetic bearing 69 has a pair of electromagnets 46. A current is supplied to five pairs of the electromagnets 46, namely, the ten electromagnets 46 individually from ten excitation amplifiers 45 provided for them.

A controller 44 is a digital arithmetic unit for controlling the motor and the magnetic bearings, and for example, FPGA (Field Programmable Gate Array) is used. The controller 44 outputs, to the inverter 43, a PWM control signal 441 for controlling ON/OFF of a plurality of switching elements included in the inverter 43, and outputs, to the excitation amplifiers 45, a PWM control signal 442 for controlling ON/OFF of switching elements included in the excitation amplifiers 45. Further, a signal relating to the motor M (a signal relating to a phase voltage or a phase current) 443 is input into the controller 44 as described later. Further, signals relating to magnetic bearings (exciting current signal and displacement signal) 444 are input.

Figure 3:
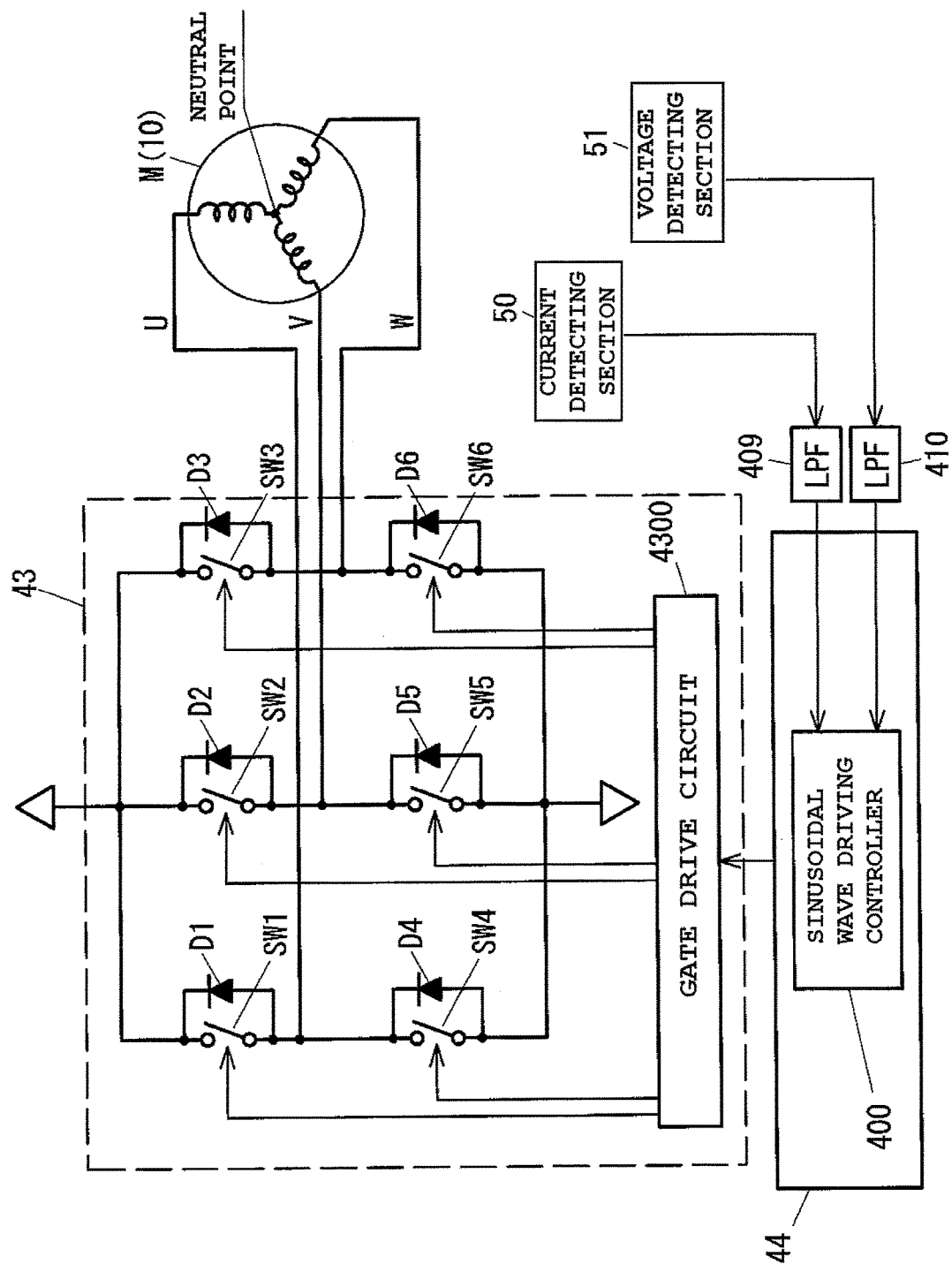
FIG. 3 is a diagram illustrating a motor driving control system relating to a motor.

FIG. 3 is a diagram illustrating a motor driving control system relating to the motor M. The motor driving control system has a sinusoidal wave driving controller 400 and the inverter 43. The inverter 43 has a plurality of switching elements SW1 to SW6, and a gate driving circuit 4300 for driving ON/OFF of the switching elements SW1 to SW6. Power semiconductor elements such as MOSFET and IGBT are used as the switching elements SW1 to SW6. Reflux diodes D1 to D6 are connected to the switching elements SW1 to SW6 in parallel, respectively.

Currents flowing in U, V and W-phase coils of the motor stator 10 are detected by a current detecting section 50, and current detection signals as detected results are input into the sinusoidal wave driving controller 400 of the controller 44 via the low-pass filter 409. Further, terminal and neutral point voltages of U, V and W-phase coils are detected by a voltage detecting section 51, and voltage detection signals as detected results are input into the sinusoidal wave driving controller 400 via a low-pass filter 410.

The sinusoidal wave driving controller 400 generates a PWM control signal for controlling ON/OFF of the switching elements SW1 to SW6 based on the current detection signals and the voltage detection signals from which noises are removed by the low-pass filters 409 and 410. The gate driving circuit 4300 generates a gate driving signal based on the PWM control signal, and turns on/off the switching elements SW1 to SW6. As a result, the voltages that are modulated into a sinusoidal wave and undergo PWM are applied to the U, V and W-phase coils.

In this embodiment, a rotational speed and a magnetic pole position are estimated based on motor current detection signals and motor voltage detection signals. In a case of a sensorless motor without a rotation sensor for detecting a rotating position of the motor rotor 11 like this embodiment, the rotational speed and the magnetic pole position are generally estimated based on the motor current detection signals and the motor voltage detection signals.

Figure 4:
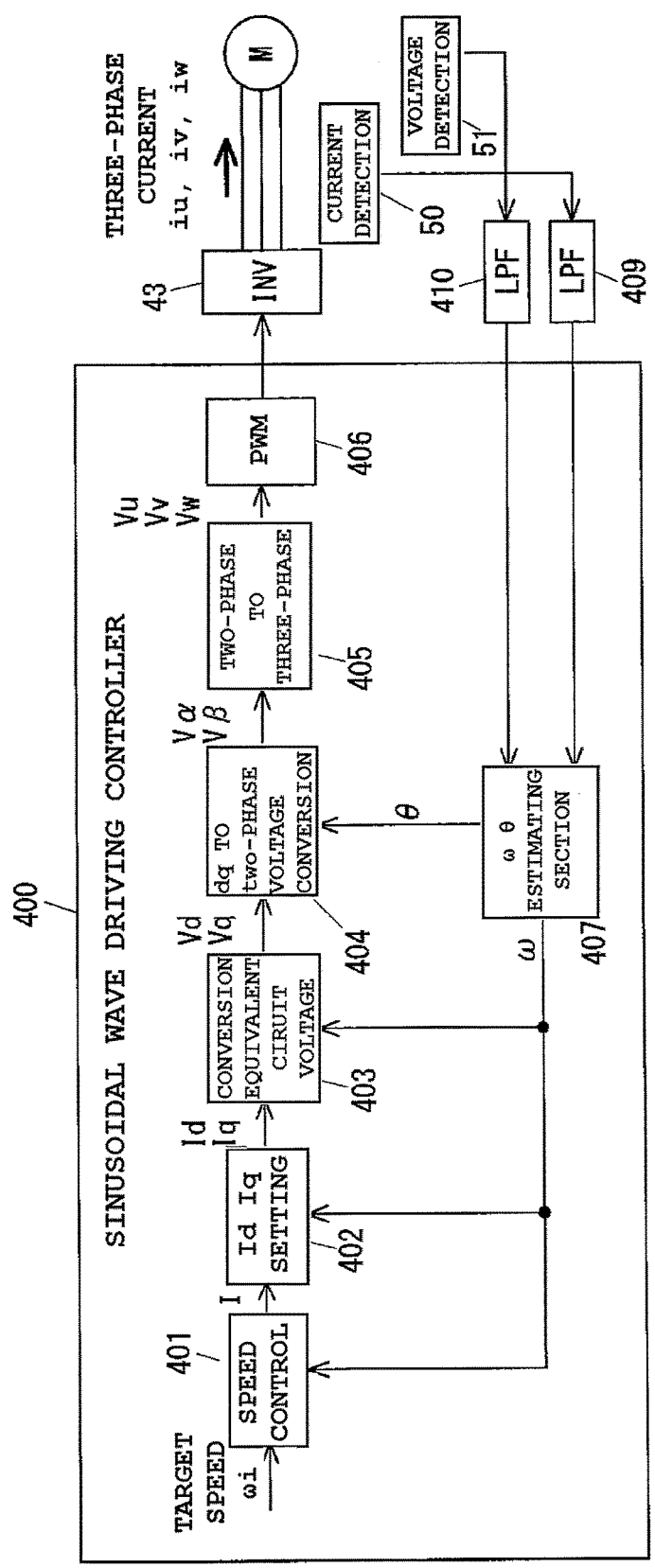
FIG. 4 is a block diagram describing a sinusoidal wave driving controller.

FIG. 4 is a block diagram describing the sinusoidal wave driving controller 400. As described with reference to FIG. 3, three-phase current flowing in the motor M is detected by the current detecting section 50, and a detected current detection signal is input into the low-pass filter 409. On the other hand, a three-phase voltage of the motor M is detected by the voltage detecting section 51, and a detected voltage detection signal is input into the low-pass filter 410.

The current detection signals that pass through the low-pass filter 409 and the voltage detection signals that pass through the low-pass filter 410 are input into a rotational speed/magnetic pole position estimating section 407. Although details are described later, the rotational speed/magnetic pole position estimating section 407 estimates a rotational speed $\omega$ and a magnetic pole position (an electrical angle $\theta$) of the motor M based on the current detection signals and the voltage detection signals. Since the magnetic pole position is expressed by the electrical angle $\theta$, hereinafter, the magnetic pole position is called as a magnetic pole electrical angle $\theta$. The calculated rotational speed $\omega$ is input into a speed controller 401, an Id and Iq setting section 402, and an equivalent circuit voltage converting section 403. Further, the calculated magnetic pole electrical angle $\theta$ is input into a dq to two-phase voltage converting section 404.

Figure 5:
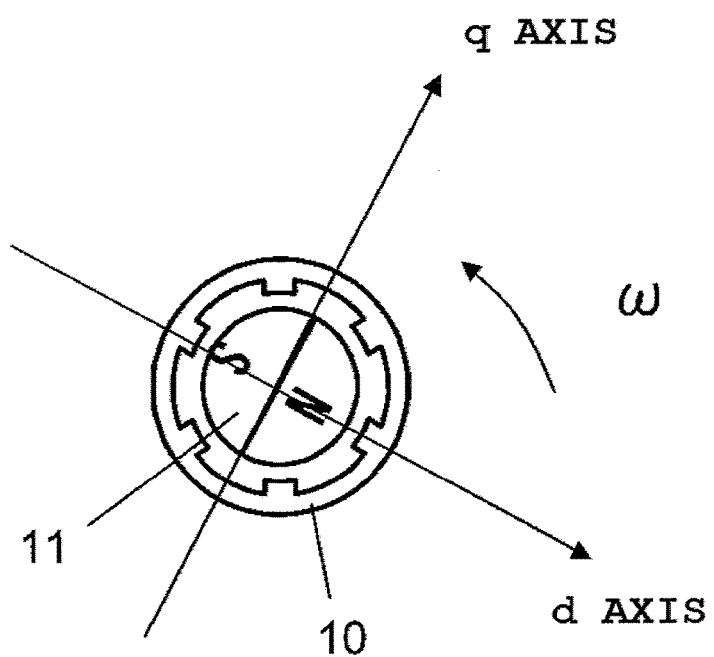
FIG. 5 is a diagram describing directions of d axis and q axis.

The speed controller 401 performs PI control (proportional control and integral control) or P control (proportional control) based on a difference between an input target rotational speed $\omega i$ and the estimated present rotational speed $\omega$ so as to output a current command I. Although details are described later, the Id and Iq setting section 402 sets current commands Id and Iq in a rotating coordinate dq system based on the current command I. As shown in FIG. 5, a d axis of the rotating coordinate dq system is a coordinate axis in which an N pole of the rotating motor rotor 11 is a positive direction. A q axis is a coordinate axis that advances by 90° perpendicularly to the d axis, and its direction is a direction of a counter electromotive voltage at the positive rotation time.

The equivalent circuit voltage converting section 403 converts the current commands Id and Iq into voltage commands Vd and Vq in the rotating coordinate dq system using the rotational speed $\omega$ calculated by the rotational speed/magnetic pole position estimating section 407 and Formula (1) based on an electric equivalent circuit constant of the motor M. The equivalent circuit is divided into a resistance component r and an inductance component L of a motor coil. The values r and L are obtained from motor specifications or the like and they are stored in a storage section (not shown) in advance.

$$\begin{pmatrix} Vd \\ Vq \end{pmatrix} = \begin{pmatrix} r & -\omega L \\ \omega L & r \end{pmatrix} \begin{pmatrix} Id \\ Iq \end{pmatrix} \quad (1)$$

The dq to two-phase voltage converting section 404 converts the voltage commands Vd and Vq in the rotating coordinate dq system into voltage commands Vα and Vβ in a fixed coordinate αβ system based on the converted voltage commands Vd and Vq and the magnetic pole electrical angle θ input from the rotational speed/magnetic pole position estimating section 407. A two-phase to three-phase voltage converting section 405 converts the two-phase voltage commands vα and vβ into three-phase voltage commands Vu, Vv and Vw. A PWM signal generating section 406 generates a PWM control signal for turning on/off (conductive or cut off) the six switching elements SW1 to SW6 provided to the inverter 43 based on the three-phase voltage commands Vu, Vv and Vw. The inverter 43 turns on/off the switching elements SW1 to SW6 based on the PWM control signal input from the PWM signal generating section 406 so as to apply a driving voltage to the motor M.

Figure 6:
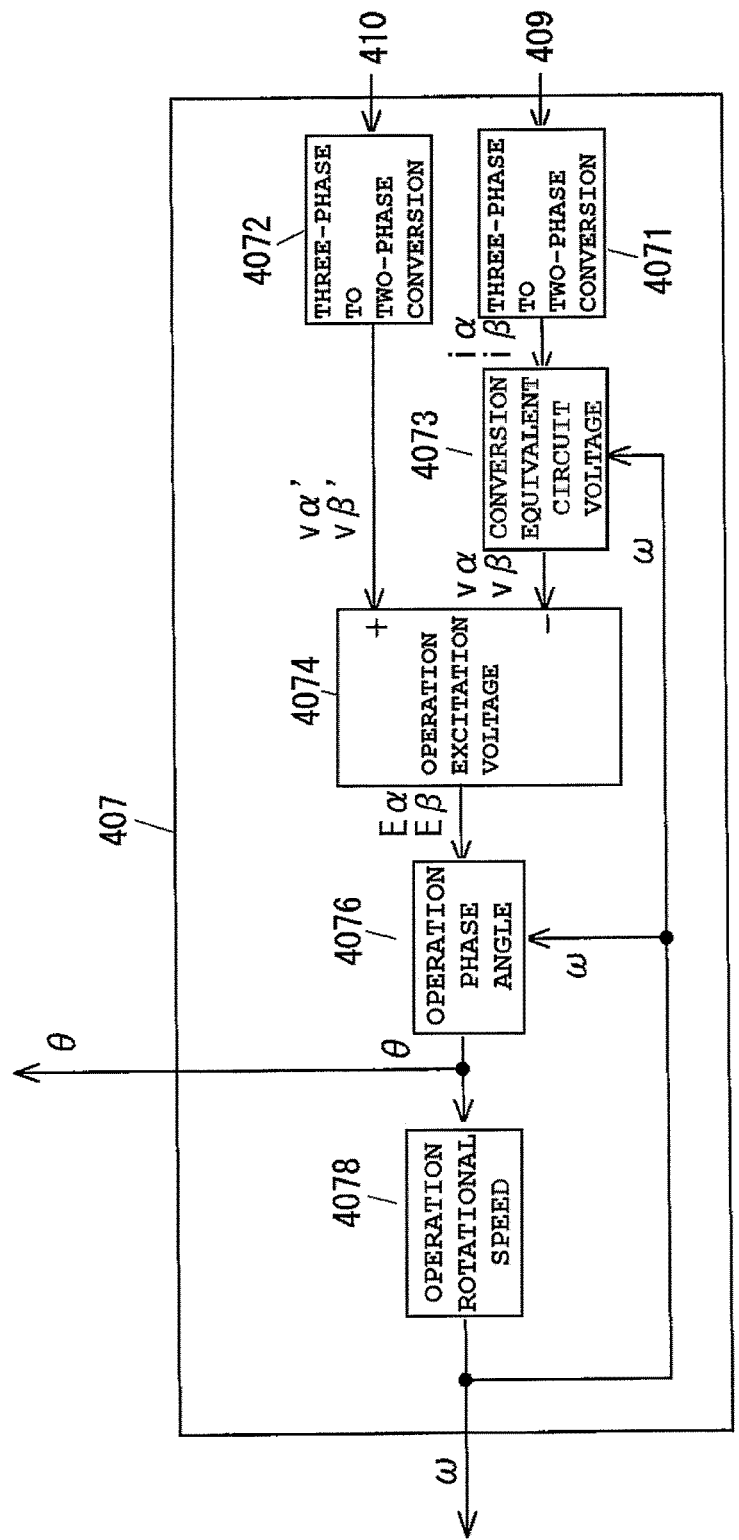
FIG. 6 is a diagram illustrating details of a rotational speed/magnetic pole position estimating section.

FIG. 6 is a diagram illustrating details of the rotational speed/magnetic pole position estimating section 407. Phase voltage detection signals vv, vu and vw output from the voltage detecting section 51 are input into a three-phase to two-phase converting section 4072 via the low-pass filter 410. The three-phase to two-phase converting section 4072 converts three-phase voltage signals into two-phase voltage signals vα' and vβ'. The converted voltage signals vα' and vβ' are input into a counter electromotive voltage arithmetic section 4074.

On the other hand, phase current detection signals iv, iu and iw output from the current detecting section 50 are input into a three-phase to two-phase converting section 4071 via the low-pass filter 409. The three-phase to two-phase converting section 4071 converts three-phase current detection signals iv, iu and iw into two-phase current signals iα and iβ. The converted current signals iα and iβ are input into an equivalent circuit voltage converting section 4073.

The equivalent circuit voltage converting section 4073 converts the current signals iα and iβ into voltage signals vα and vβ using following Formula (2) based on the electric equivalent circuit constant of the motor M. The converted voltage signals vα and vβ are input into the counter electromotive voltage arithmetic section 4074. The equivalent circuit is divided into a resistance component r and an inductance component L of a motor coil. The values r and L are obtained from motor specifications or the like and they are stored in a storage section (not shown) in advance.

$$\begin{pmatrix} v\alpha \\ v\beta \end{pmatrix} = \begin{pmatrix} r & -\omega L \\ \omega L & r \end{pmatrix} \begin{pmatrix} i\alpha \\ i\beta \end{pmatrix} \quad (2)$$

The counter electromotive voltage arithmetic section 4074 calculates counter electromotive voltages Eα and Eβ using following Formula (3) according to the voltage signals vα' and vβ' based on motor three-phase voltages and the voltage signals vα and vβ based on motor three-phase currents.

$$\begin{pmatrix} E\alpha \\ E\beta \end{pmatrix} = \begin{pmatrix} v\alpha' \\ v\beta' \end{pmatrix} - \begin{pmatrix} v\alpha \\ v\beta \end{pmatrix} \quad (3)$$

Figure 7:
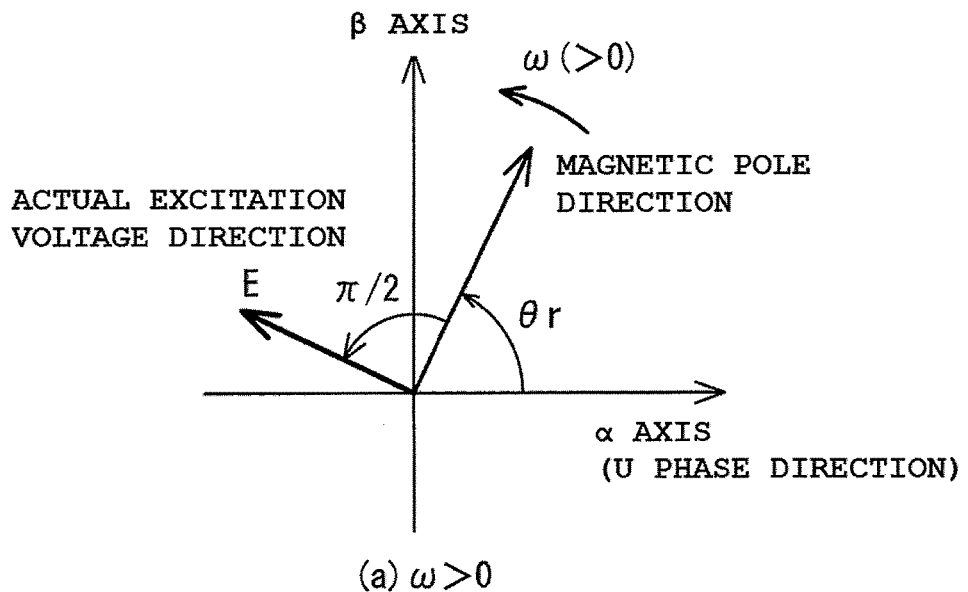
FIG. 7 is a diagram describing a relationship between a counter electromotive voltage E ($E\alpha$ and $E\beta$) and a magnetic pole direction (magnetic pole position)
Figure 7:
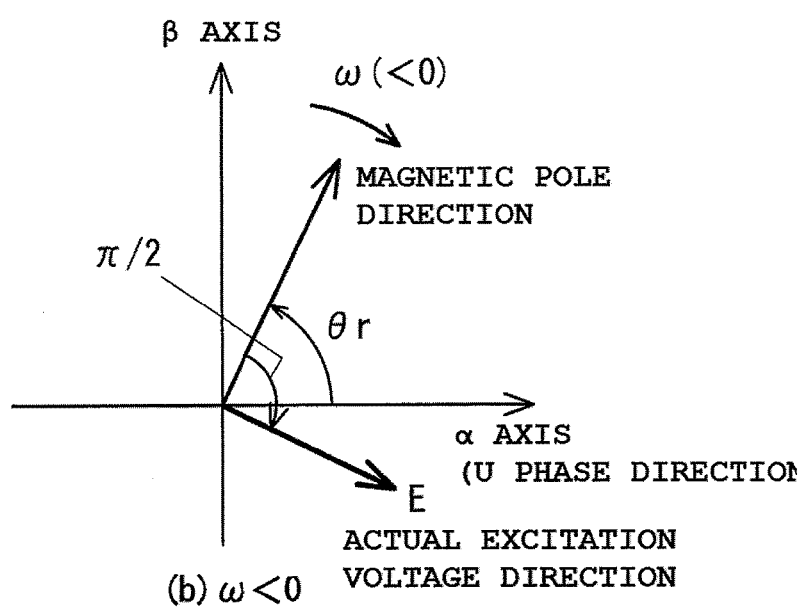

A phase angle arithmetic section 4076 calculates a vector phase angle θ of counter electromotive voltages (Eα and Eβ) in the fixed coordinate αβ system. FIG. 7 is a diagram describing a relationship between the counter electromotive voltages (Eα and Eβ) and a magnetic pole direction (magnetic pole position). A direction of the counter electromotive voltage vector (Eα and Eβ) in the fixed coordinate αβ system is a direction that advances by 90 deg (π/2 rad) with respect to a magnetic pole position (magnetic pole electric angle) θr.

FIG. 7A illustrates a case where the rotational speed ω is such that ω>0 (namely, the positive rotation). In this case, the 90 deg advancing direction is shifted to a position that is rotated counterclockwise (positive rotational direction) by 90 deg from the magnetic pole position θr. For this reason, the magnetic pole position θ to be estimated that is approximated to the actual magnetic pole position θ is calculated by applying a function of four-quadrant arc tangent according to following Formula (4).

$$\theta = \tan^{-1}(-E\alpha/E\beta) \quad (4)$$

On the other hand, when ω<0 (namely, reverse rotation), a relationship between the magnetic pole position θr and the counter electromotive voltage vector (Eα, Eβ) is as shown in FIG. 7B. In the case of the reverse rotation, the 90 deg advancing direction is shifted to a position that is rotated clockwise (reverse rotational direction) by 90 deg from the magnetic pole position θr. For this reason, the magnetic pole position θ to be estimated that is approximated to the actual magnetic pole position θr is calculated by applying the function of the four-quadrant arc tangent using following Formula (5).

$$\theta = \tan^{-1}(+E\alpha/-E\beta) \quad (5)$$

That is to say, when the rotational speed ω feedback-input from a rotational speed arithmetic section 4078, described later, is such that ω>0, the phase angle arithmetic section 4076 calculates the magnetic pole electrical angle θ (vector phase angle of the counter electromotive voltages (Eα and Eβ)) using following Formula (4), and when ω<0, it calculates the magnetic pole electrical angle θ using Formula (5). The rotational speed ω fed back to the phase angle arithmetic section 4076 is a rotational speed that is calculated at previous control sampling timing.

The rotational speed arithmetic section 4078 calculates the rotational speed ω based on the magnetic pole electrical angle θ input from the phase angle arithmetic section 4076. Since the rotational speed ω is a changing rate of the magnetic pole electrical angle θ, the rotational speed ω is calculated by a differential operation or a difference operation. When difference is applied, a present phase angle θ1 calculated this time when arithmetic is repeated at a control sampling time T, and a phase angle θ1 calculated at each predetermined time T1 that is a natural number multiple of T as past (previous) phase angles are stored in advance, so that a difference Δθ1 between the present phase angle and the past (previous) phase angle is calculated. The difference Δθ1 is divided by a time T1 as a difference interval so that the rotational speed ω (=Δθ1/T1) is calculated. When Δθ>0, the rotational speed ω is for the positive rotation (w>0), and when Δθ<0, the rotational speed ω is for the reverse rotation (ω<0). Even if the rotational speed is close to 0 (nearly stops) and a sign is reversed and the selection of Formulas (4) and (5) is inappropriate, changing rates of the respective angles θ calculated using Formulas (4) and (5) are the same, and no problem arises in the calculation of the rotational speed.

In such a manner, the calculation formula for the magnetic pole electrical angle θ is switched between Formulas (4) and (5) according to the positive and negative values of the estimated rotational speed ω estimated. Accordingly, a suitable magnetic pole electrical angle θ can be obtained even though in any of cases where the rotational speed ω has the positive and negative values. As a result, the rotational speed ω and the magnetic pole electrical angle θ according to the positive and negative rotations (positive rotation and reverse rotation) in the rotor rotational direction are output from the rotational speed/magnetic pole position estimating section 407. In the first embodiment, the Id and Iq setting section 402 executes the following process according to the positive and negative values of the rotational speed ω input from the rotational speed/magnetic pole position estimating section 407.

The case where the rotational speed ω input from the rotational speed/magnetic pole position estimating section 407 is such that ω≥0, namely, the case where the motor rotor is in a positive rotational state or a stopped state is considered. In this case, the Id and Iq setting section 402 sets the current command Iq of a q-axial current for giving a motor torque so that Iq>0 at an acceleration control time (ωi>ω). As a result, the rotation of the motor rotor that rotates in the positive direction is accelerated. On the contrary, at the time of deceleration control time (ωi<ω), the Id and Iq setting section 402 sets the current command Iq so that Iq<0, and decelerates the rotation of the motor rotor that rotates in the positive direction.

On the other hand, a case where the rotational speed ω is such that ω<0, namely, the motor rotor rotates reversely is considered. In the vacuum pump, the motor M is driven only in one direction (positive rotational direction). For this reason, in the reverse rotational state, the current command Iq is always set so that Iq>0. When Iq>0, a torque is generated in the positive rotational direction (direction of ω in FIG. 7A) with respect to the motor rotor. For this reason, the rotation of the motor rotor rotating reversely always decelerates. When the torque in the positive rotational direction is generated, the reverse rotation of the motor rotor decelerates to stop. Since the target rotational speed ωi to be input into the speed controller 401 is such that ωi>0 at the pump starting time, the motor rotor is driven in the positive rotational direction after the motor rotor stops.

In the first embodiment, the calculation formula for the magnetic pole electrical angle θ is switched between Formulas (4) and (5) according to the positive and negative values of the rotational speed ω, so that the rotational speed ω and the magnetic pole electrical angle θ according to the positive and negative rotations in the rotor rotational direction (positive rotation and reverse rotation) are obtained. The motor rotational direction of the vacuum pump can be suitably controlled by using the information (ω and θ). Further, when the rotational speed ω is such that ω<0, the Id and Iq setting section 402 always sets the current command Iq so that Iq>0. For this reason, when the motor M rotates reversely, it quickly decelerates without acceleration.

—Second Embodiment—

Figure 8:
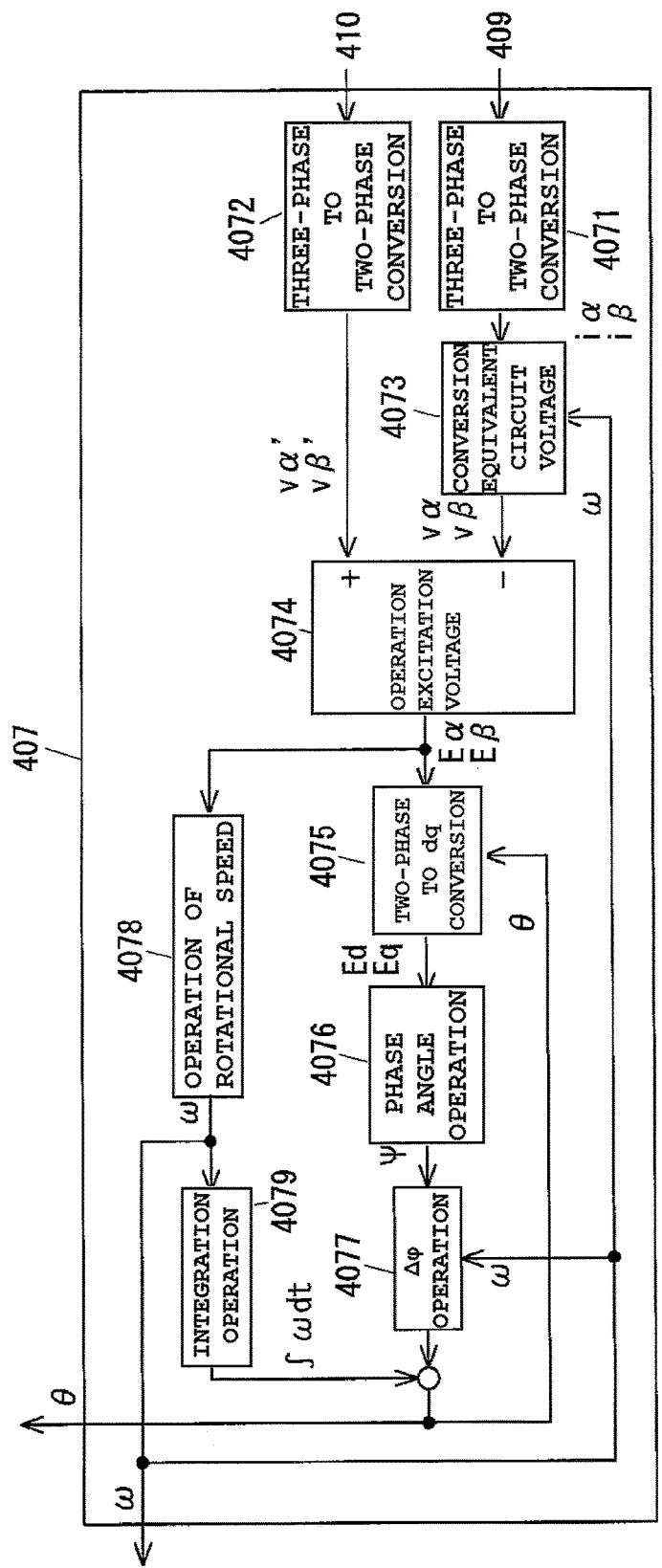
FIG. 8 is a diagram illustrating the rotational speed/magnetic pole position estimating section according to a second embodiment.
Figure 9:
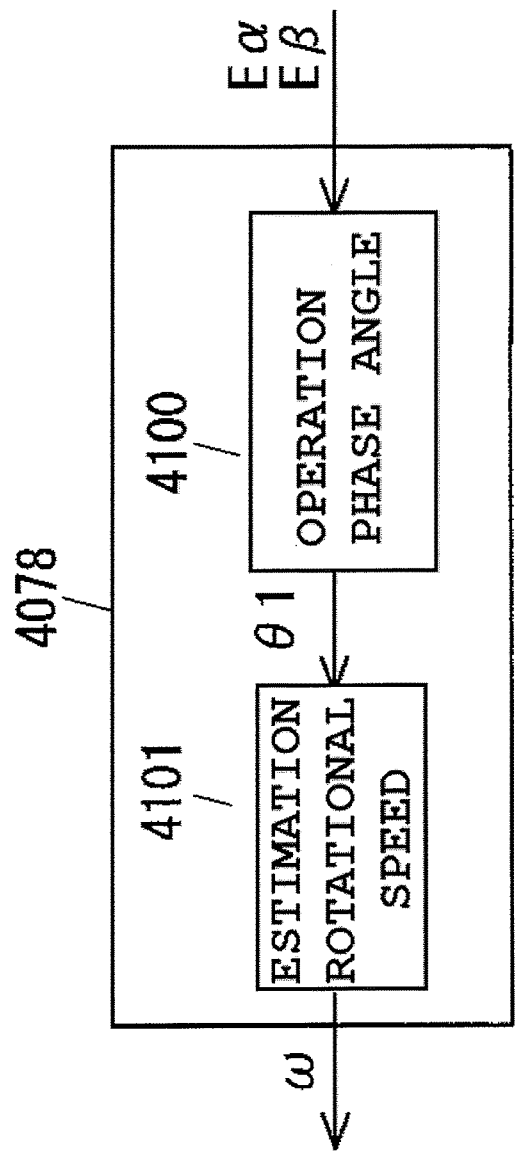
FIG. 9 is a block diagram illustrating one example of estimating calculation in a rotational speed arithmetic section.

FIGS. 8 and 9 are diagrams illustrating a second embodiment. Processes in three-phase to two-phase converting sections 4071 and 4072, an equivalent circuit voltage converting section 4073, and a counter electromotive voltage arithmetic section 4074 are similar to the case of the constitution in FIG. 6, and the description about the processes up to the process in the counter electromotive voltage arithmetic section 4074 is omitted.

In the second embodiment, after the counter electromotive voltage arithmetic section 4074 calculates counter electromotive voltages Eα and Eβ, it calculates a rotational speed ω and a magnetic pole phase shift correcting amount Δφ based on the counter electromotive voltages Eα and Eβ, and estimates an angle θ from the rotational speed ω and the magnetic pole phase shift correcting amount Δφ. At this time, the calculation of the rotational speed ω and the calculation of the magnetic pole phase shift correcting amount Δφ are made independently.

The rotational speed ω is an amount relating to periodicity of the magnetic pole electrical angle θ. On the other hand, the magnetic pole phase shift correcting amount Δφ is an amount relating to a phase shift between an actual magnetic-electrical angle θr and an estimated magnetic pole electrical angle θ. The magnetic pole electrical angle θ is calculated based on the calculated rotational speed ω and magnetic pole phase shift correcting amount Δφ according to θ=∫ωdt+Δφ.

(Calculation of the Magnetic Pole Phase Shift Correcting Amount Δφ)

The calculation of the magnetic pole phase shift correcting amount Δφ is described. The rotational speed of a motor rotor 11 does not abruptly change in one rotational period due to rotary inertia of the rotor, but changes slowly in at least several periods, and this can be regarded as stationary response. Therefore, a two-phase to dq voltage converting section 4075 converts the counter electromotive voltages (Eα and Eβ) input by conversion expressed by Formula (6) into counter electromotive voltages (Ed, Eq) in the rotating coordinate dq system. The magnetic pole electrical angle θ that is calculated at the previous calculation timing in the calculation performed at a predetermined time interval T (an interval of the control sampling timing) is fed back to the angle θ in Formula (6).

$$\begin{pmatrix} Ed \\ Eq \end{pmatrix} = \begin{pmatrix} \cos\theta & \sin\theta \\ -\sin\theta & \cos\theta \end{pmatrix} \begin{pmatrix} E\alpha \\ E\beta \end{pmatrix} \quad (6)$$

Coordinate conversion using complex notation is as follows. An α component Eα and a β component Eβ of the counter electromotive voltages (Eα and Eβ) correspond to a real part and an imaginary part of E×exp (j(θr+π/2)), when ω>0. Further, when ω<0, the voltages Eα and Eβ correspond to a real part and an imaginary part of E×exp (j(θr−π/2)). E represents a level of a counter electromotive voltage, and θr represents the actual magnetic pole electrical angle.

On the contrary, the two-phase to dq coordinate conversion to which the estimated magnetic pole electrical angle θ is applied is expressed by multiplying a counter electromotive voltage that is notated by complex by exp (−jθ). Therefore, the counter electromotive voltages (Ed and Eq) that were subject to the two-phase to dq coordinate conversion are expressed by an real part and an imaginary part of E×exp (j(θr+π/2−θ)) when ω>0. The counter electromotive voltages (Ed and Eq) are expressed by a real part and an imaginary part of E×exp(j(θr−π/2−θ)), when ω<0.

Figure 10:
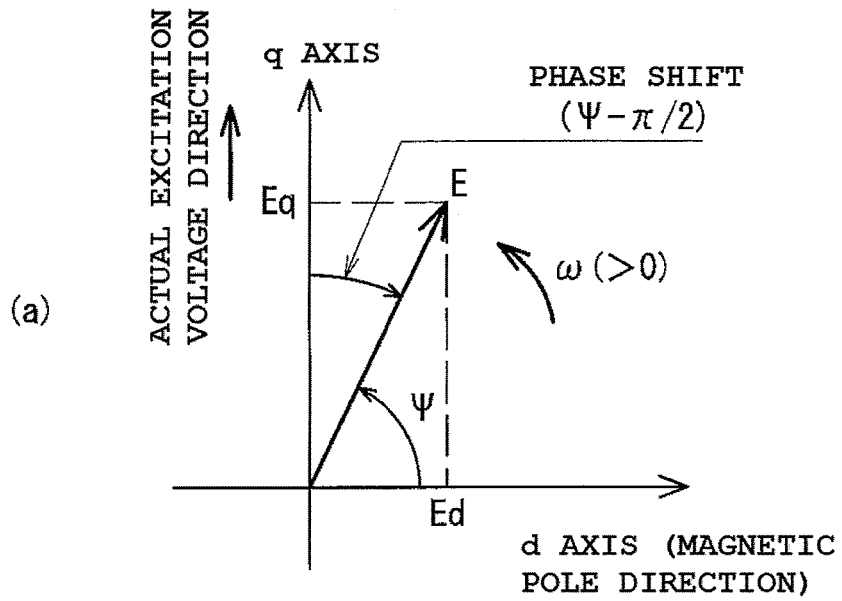
FIG. 10 is a diagram describing a phase shift in a rotating coordinate dq system.
Figure 10:
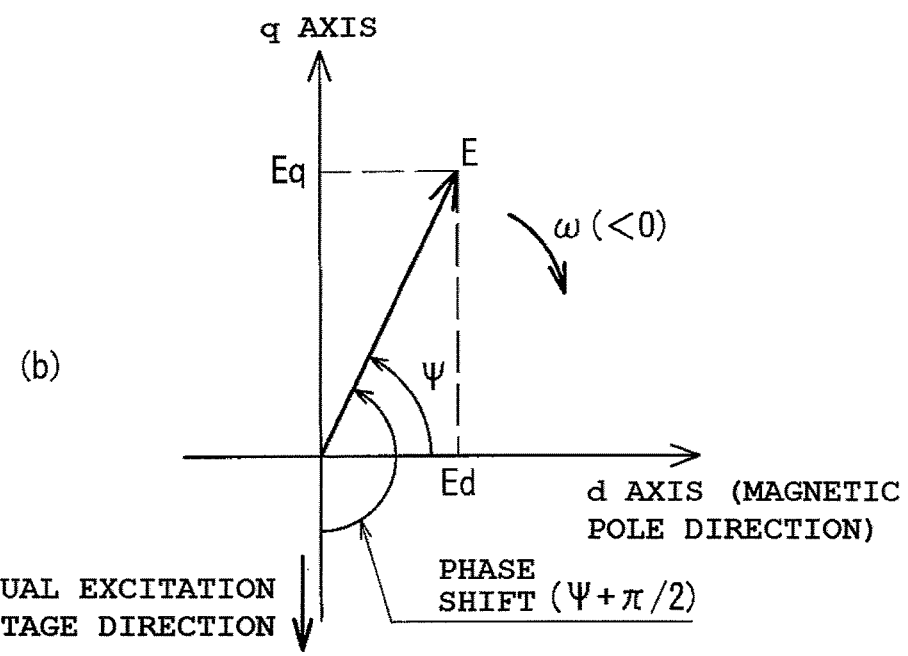

A phase angle arithmetic section 4076 calculates a vector phase angle Ψ of the counter electromotive voltage (Ed and Eq) in the rotating coordinate dq system according to Ψ=tan$^{-1}$(Eq/Ed) by applying a function of the four-quadrant arc tangent. When ω>0, the phase angle Ψ is such that Ψ=θr+π/2−θ, and when ω<0, it is such that Ψ=θr−π/2−θ. FIG. 10 is a diagram describing a magnetic pole phase shift in the rotating coordinate dq system. FIG. 10A illustrates a case of the positive rotation (ω>0), and FIG. 10B illustrates a case of the reverse rotation (ω<0). Therefore, when the magnetic pole electrical angle θ to be estimated is converged to the actual magnetic pole electrical angle θr and ω>0, the control is made so that Ψ−π/2 converges to 0. When ω<0, the control is made so that Ψ+π/2 converges to 0.

A correcting amount Δφ arithmetic section 4077 calculates the magnetic pole phase shift correcting amount Δφ for correcting the magnetic pole phase shift. That is to say, the magnetic pole phase shift correcting amount Δφ is added to the estimated magnetic pole electrical angle so that Ψ−π/2 converges to 0 in the positive rotation, and Ψ+π/2 converges to 0 in the reverse rotation.

When ω>0, the magnetic pole phase shift correcting amount Δφ is generated by multiplication of a suitable gain g1 (a gain of proportional control or a gain of proportional control·integral control) based on a value of Ψ−π/2 (rad) (a change amount of the positive and negative rotation) as expressed by Formula (7). According to Formula (7), when Ψ−π/2<0 (namely, θr<θ), Δφ<0 as shown in FIG. 10A. That is to say, the magnetic pole electrical angle θ that is a leading phase with respect to the actual magnetic pole electrical angle θr is approximated to θr.

Δφ=g1×(Ψ−π/2): in a case where Ψ−π/2≠0

Δφ=0: in a case where Ψ+π/2=0 (7)

When ω<0, the magnetic pole phase shift correcting amount Δφ is set as expressed in Formula (8). For example, in a case of FIG. 10B, since Ψ+π/2>0 (namely, θr>θ), Δφ>0, and thus the magnetic pole electrical angle θ that is a delay phase with respect to the actual magnetic pole electrical angle θr is approximated to θr.

Δφ=g1×(Ψ+π/2): in a case where Ψ+π/2≠0

Δφ=0: in a case where Ψ+π/2=0 (8)

(Calculation of the Rotational Speed ω)

On the other hand, separately from the calculation of the magnetic pole phase shift correcting amount Δφ, a rotational speed arithmetic section 4078 performs estimating calculation of the rotational speed ω. An integration operating section 4079 obtains integrated value ∫ωdt of the rotational speed ω. FIG. 9 is a block diagram illustrating one example of estimating calculation in the rotational speed arithmetic section 4078.

A phase angle arithmetic section 4100 calculates a phase angle θ1 of the counter electromotive voltages (Eα and Eβ) using Formula (9) based on the counter electromotive voltages (Eα and Eβ) input from the counter electromotive voltage arithmetic section 4074. The phase angle θ1 indicates a magnetic pole direction (magnetic pole position) in FIG. 7.

θ1=tan$^{-1}$(−Eα/Eβ) (9)

In the fixed coordinate αβ system shown in FIG. 7, since the rotation in the magnetic pole direction is made at the rotational speed ω, the phase angle θ1 in Formula (9) changes temporally. A rotational speed estimating section 4101 calculates differential or difference of the phase angle θ1 that changes in such a manner, so as to calculate (estimate) the rotational speed ω. Since only the rotational speed ω is calculated, the same Formula (Formula 9) is used regardless of the positive or negative rotation at the rotational speed ω. When delta is applied, a present phase angle θ1 calculated this time when arithmetic is repeated at a control sampling time T, and a phase angle θ1 calculated at each predetermined time T1 that is a natural number multiple of T as past (previous) phase angles are stored in advance, so that a difference Δθ1 between the present phase angle and the past (previous) phase angle is calculated. The difference Δθ1 is divided by a time T1 as a difference interval so that the rotational speed ω (=Δθ1/T1) is calculated.

The rotational speed ω calculated by the rotational speed arithmetic section 4078 is input into the integration operating section 4079 and the equivalent circuit voltage converting section 4073, and is output from a rotational speed/magnetic pole position estimating section 407. The integration operating section 4079 calculates an integrate value of the rotational speed ω. When the integrated value is expressed by using the control sampling time T, the integrated value (next time)=the integrated value (present value)+ω×T. A sum (following Formula (10)) of the integrated value and the magnetic pole phase shift correcting amount Δφ calculated by the correcting amount Δφ arithmetic section 4077 is input, as the magnetic pole electrical angle θ at next control timing after the time T passes from this control timing, into the two-phase to dq voltage converting section 4075, and is output from the rotational speed/magnetic pole position estimating section 407.

θ(next time)=integrated value(next time)+Δφ (10)

In the second embodiment, in addition to the function similar to that in the first embodiment, the following effect is produced. That is to say, the calculation of the rotational speed ω and the calculation of the magnetic pole phase shift correcting amount Δφ are made independently, so that a steady-state error of the rotational speed ω can be reduced. As a result, drive stability can be improved in sensorless sine wave drive, and flow ripple of a motor current can be reduced and drive efficiency can be improved.

—Third Embodiment—

Figure 11:
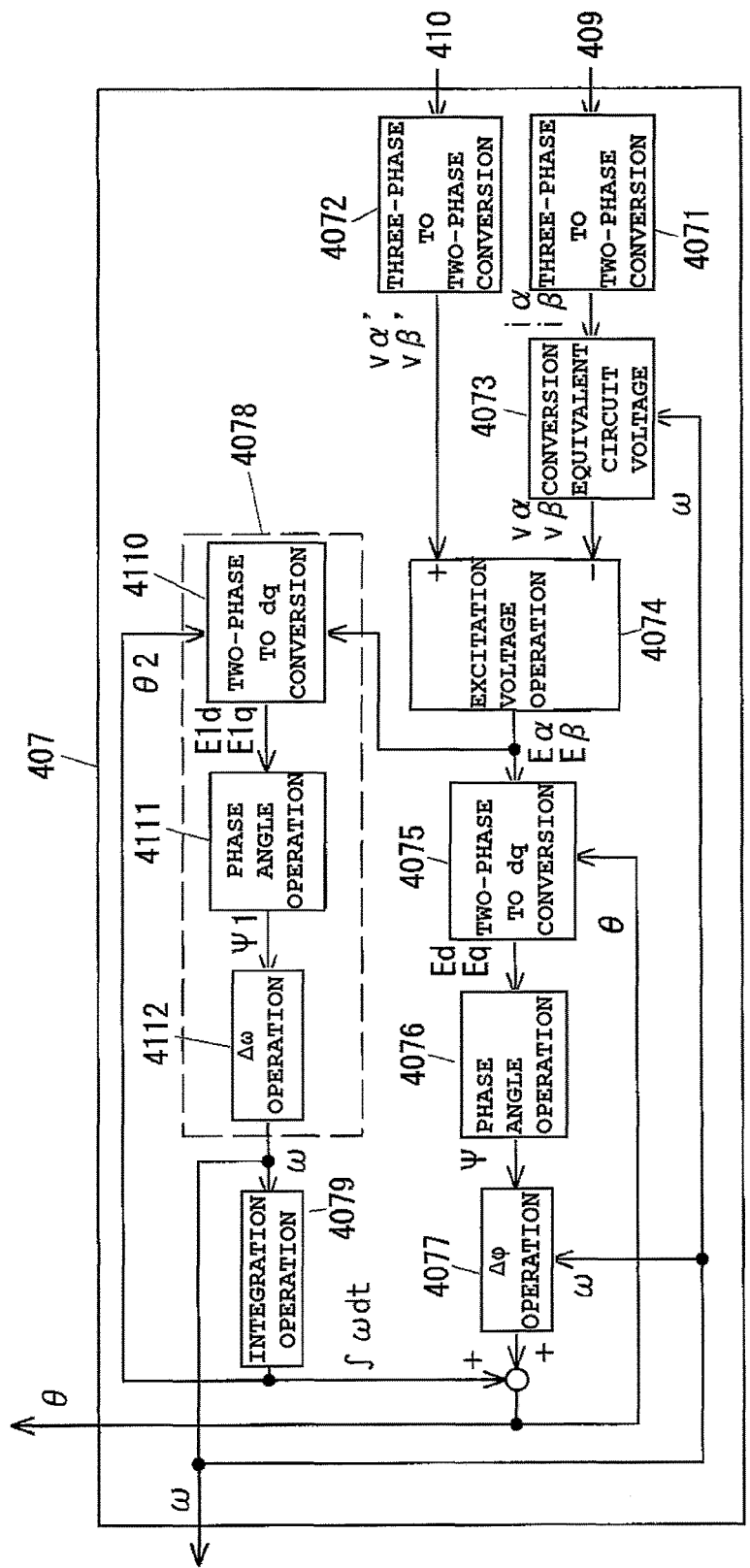
FIG. 11 is a diagram illustrating the rotational speed/magnetic pole position estimating section according to a third embodiment.

FIG. 11 is a diagram illustrating details of a rotational speed/magnetic pole position estimating section 407 according to a third embodiment. The third embodiment is different from the second embodiment shown in FIGS. 8 and 9 in the constitution of a rotational speed arithmetic section 4078, and in that the integrated value of the rotational speed ω calculated by an integration operating section 4079 is set as θ2 and is fed back to the rotational speed arithmetic section 4078. Portions different from the second embodiment are mainly described below.

A two-phase to dq voltage converting section 4110 of a rotational speed arithmetic section 4078 calculates counter electromotive voltages (E1$d$ and E1$q$) in a rotating coordinate dq system using following Formula (11) based on the counter electromotive voltages (Eα and Eβ) input from a counter electromotive voltage arithmetic section 4074 and an integrated value θ2 output from the integration operating section 4079. The integrated value (electrical angle) θ2 to be used here is the magnetic pole electrical angle whose magnetic pole phase shift is not corrected by a magnetic pole phase shift correcting amount Δφ differently from a magnetic pole electrical angle θ to be used in a two-phase to dq voltage converting section 4075.

$$\begin{pmatrix} E1d \\ E1q \end{pmatrix} = \begin{pmatrix} \cos\theta 2 & \sin\theta 2 \\ -\sin\theta 2 & \cos\theta 2 \end{pmatrix} \begin{pmatrix} E\alpha \\ E\beta \end{pmatrix} \quad (11)$$

A phase angle arithmetic section 4111 calculates a phase angle Ψ1 according to following Formula (12). As described in FIG. 7 and FIG. 10, in a fixed coordinate αβ system, counter electromotive voltage vectors (Eα and Eβ) rotate at the rotational speed ω. On the other hand, in a case where the actual magnetic pole electrical angle θr and the estimated magnetic pole electrical angle θ have the same periodicity, even if a phase shift occurs, the rotational speed ω to be estimated in the rotating coordinate dq system converges to the actual rotational speed ωr. As a result, the phases Ψ1 of the counter electromotive voltages (E1d and E1q) that are subject to two-phase to dq voltage conversion have a constant value. On the contrary, when not converge, the phases Ψ1 change.

$$\Psi 1 = \tan^{-1}(E1q/E1d) \quad (12)$$

A rotational speed shift correcting section 4112 calculates a correcting amount Δω (=ω(next time)−ω (present value)) for correcting rotational speed shift based on a change ΔΨ1 in the phase Ψ1. The correcting amount Δω is generated by multiplication of a suitable gain g2 (a gain of proportional control or a gain of proportional control·integral control) based on the value of ΔΨ1 (ΔΨ1 has the positive or negative values) as expressed in Formula (13). Since the change in the phase Ψ1 is proportional to the rotational speed shift (ωr−ω), when ωr>ω, ΔΨ1>0, and the correcting amount Δω acts to increase the rotational speed.

$$\Delta\omega = g2 \times \Delta\Psi 1: \text{ in a case where } \Delta\Psi 1 \neq 0$$

$$\Delta\omega = 0: \text{ in a case where } \Delta\Psi 1 = 0 \quad (13)$$

Further, the rotational speed shift correcting section 4112 adds the calculated correcting amount Δω to the rotational speed ω (present value) currently used so as to calculate the rotational speed ω (next time) of next timing (Formula (14)). The correction is made successively by using Formula (14) in each sampling period, so that the rotational speed ω can be converged to the true rotational speed ωr. In such a converging process, since the steady-state error (offset) is controlled to be zero, the steady-state error that is a conventional problem can be minimum.

$$\omega(\text{next time}) = \omega(\text{present value}) + \Delta\omega \quad (14)$$

The integration operating section 4079 calculates integrated value ∫ωdt based on the rotational speed ω output from the rotational speed shift correcting section 4112. This integrated value ∫ωdt is added to a magnetic pole phase shift correcting amount Δφ calculated by a correcting amount Δφ arithmetic section 4077, so that the magnetic pole electrical angle (next time) θ is obtained. Further, the integrated value ∫ωdt is fed back to be input into a two-phase to dq voltage converting section 4110 as an electrical angle θ2.

In the third embodiment, in order to prevent a deterioration in safety due to an increase in an error, the magnetic pole electrical angle θ (=∫ωdt+Δφ) is applied to the calculation of the magnetic pole phase shift correcting amount Δφ. The magnetic pole electrical angle θ2 (=∫ωdt) that does not include the magnetic pole phase shift correcting amount Δφ is applied to the calculation of the rotational speed ω. This is because the rotational speed ω is calculated based on a difference and a differential of the phase angle Ψ1, and thus it is sufficient as long as periodicity information is provided.

—Fourth Embodiment—

Figure 12:
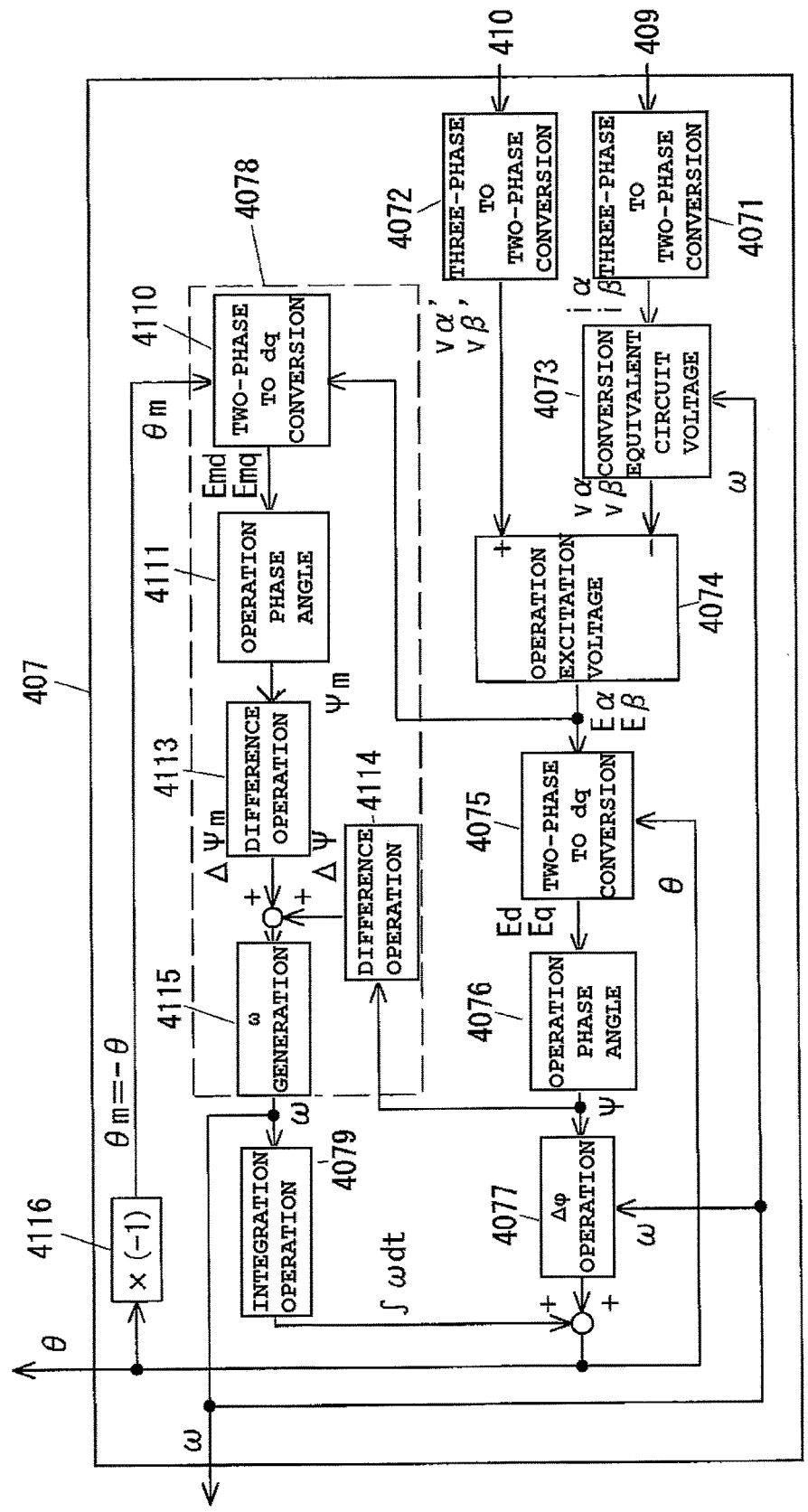
FIG. 12 is a diagram illustrating the rotational speed/magnetic pole position estimating section according to a fourth embodiment.

FIG. 12 is a diagram illustrating details of a rotational speed/magnetic pole position estimating section 407 according to a fourth embodiment. The rotational speed/magnetic pole position estimating section 407 shown in FIG. 12 is different from the third embodiment in that difference arithmetic sections 4113 and 4114 are provided in a rotational speed arithmetic section 4078, and an electrical angle θm that is obtained by inverting a sign of the angle θ is fed back to a two-phase to dq converting section. Portions different from the third embodiment are described below.

A two-phase to dq voltage converting section 4110 of a rotational speed arithmetic section 4078 calculates counter electromotive voltage (Emd and Emq) in a rotating coordinate dq system using following Formula (15) based on the counter electromotive voltages (Eα and Eβ) input from a counter electromotive voltage arithmetic section 4074 and an electrical angle θm output from a sign inverting section 4116. The sign inverting section 4116 multiplies an estimated magnetic pole electrical angle θ (=∫ωdt+Δφ) by (−1), and outputs the result as an electrical angle θm (=−θ).

$$\begin{pmatrix} Emd \\ Emq \end{pmatrix} = \begin{pmatrix} \cos\theta m & \sin\theta m \\ -\sin\theta m & \cos\theta m \end{pmatrix} \begin{pmatrix} E\alpha \\ E\beta \end{pmatrix} \quad (15)$$

A phase angle arithmetic section 4111 calculates a phase angle Ψm using following Formula (16). In a fixed coordinate αβ system, the counter electromotive voltage vectors (Eα and Eβ) rotate at a rotational speed ω. On the other hand, in the rotating coordinate dq system, when the estimated rotational speed ω converges to the actual rotational speed ωr, the phases Ψm of the counter electromotive voltages (Emd and Emq) being subject to two-phase to dq voltage conversion using the magnetic pole electrical angle θm become constant. On the contrary, when not converge, the phase Ψm changes.

[Formula 16]

$$\Psi m = \tan^{-1}(Emq/Emd) \quad (16)$$

The difference arithmetic section 4113 calculates a difference ΔΨm of the phase Ψm. In this case, a present phase angle Ψm calculated this time when arithmetic is repeated at a control sampling time T, and a phase angle Ψm calculated at each predetermined time T1 that is a natural number multiple of T as past (previous) phase angles are stored in advance, so that a difference ΔΨm between the present phase angle and the past (previous) phase angle is calculated. On the other hand, the difference arithmetic section 4114 calculates the difference ΔΨ using the phase angle Ψ output from a phase angle arithmetic section 4076. Instead of the difference operation, a differential operation may be performed.

As described in the second embodiment, when ω>0, the value Ψ is such that Ψ=θr+π/2−θ, and when ω<0, Ψ=θr−π/2−θ. However, when the difference ΔΨ is obtained between the predetermined times T1, it is expressed as ΔΨ=Δθr−Δθ=(ωr−ω) T1 regardless of the rotational direction (positive or negative value of ω). Similarly, the phase angle Ψm is expressed as ΔΨm=Δθr−Δθm=Δθm=Δθr+Δθ= (ωr+ω)T1.

When the difference ΔΨm output from the difference arithmetic section 4113 and the difference ΔΨ output from the difference arithmetic section 4114 are added at a summing point, ΔΨ+ΔΨm=2ωr·T1. A ω generating section 4115 multiplies the input added difference expressed as ΔΨm+ ΔΨ=2ωr·T by 0.5, and then divides the value by the time T1, so as to calculate the rotational speed ω. The ω generating section 4115 outputs the calculated result as an estimated angular velocity ω. The rotational speed ω output from the ω generating section 4115 is input into an integration operating section 4079, a correcting amount Δφ arithmetic section 4077, and an equivalent circuit voltage converting section 4073, and is output from the rotational speed/magnetic pole position estimating section 407.

The ω generating section 4115 executes the process for extracting the actual rotational speed ωr such as (ΔΨm+ΔΨ)/2T=ωr. However, since actually the differences ΔΨn and ΔΨ include an error, the rotational speed ω does not always match with an actual rotational speed ωr. However, since the actual rotational speed ωr is extracted, the rotational speed ω and the integrated value ∫ωdt can be estimated more accurately. This has an effect particularly on a case where the rotational speed is low, and a case where the control sampling interval T is set to be longer.

—Fifth Embodiment—

Figure 13:
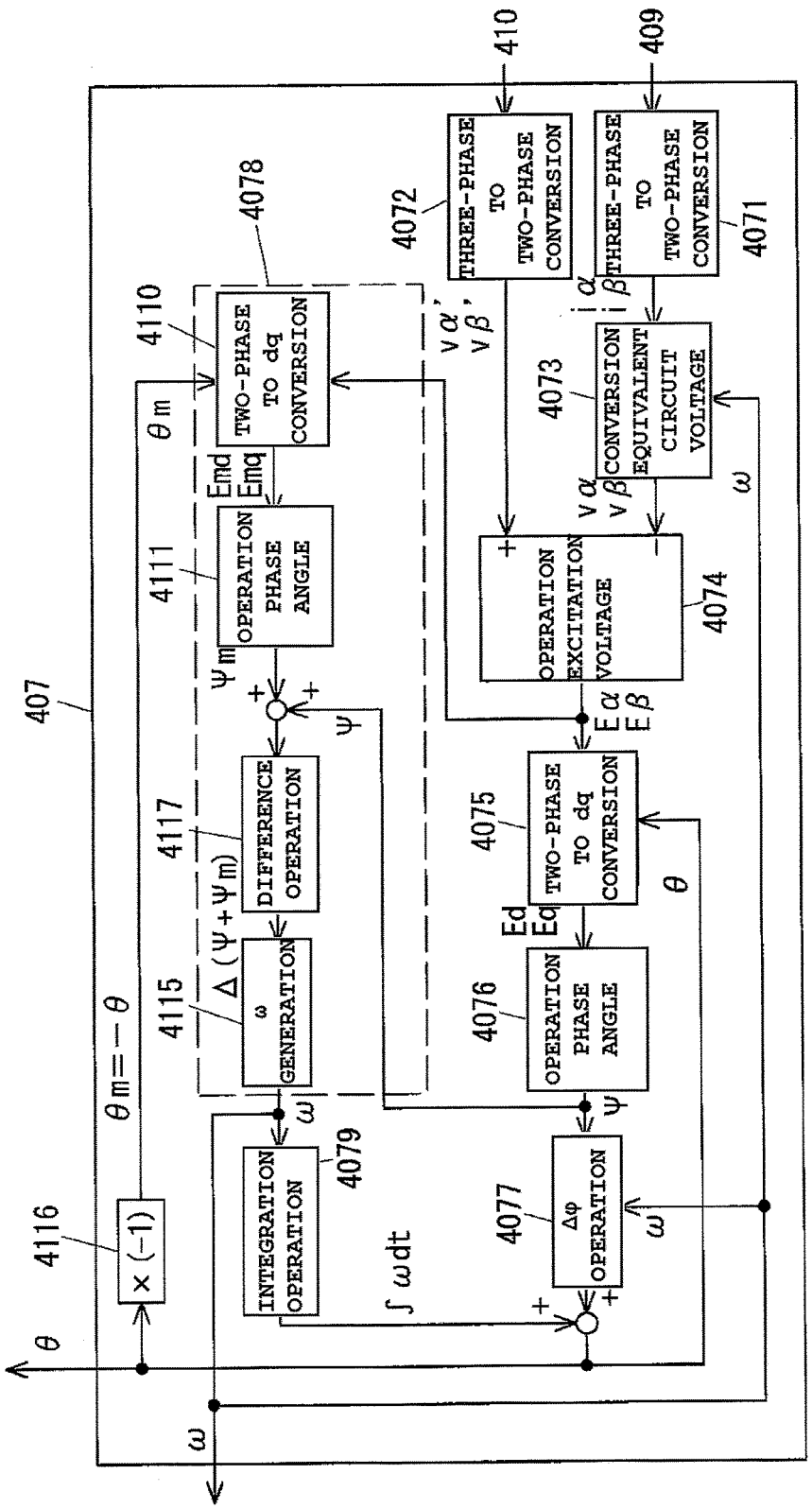
FIG. 13 is a diagram illustrating details of the rotational speed/magnetic pole position estimating section according to a fifth embodiment.

FIG. 13 is a diagram illustrating details of the rotational speed/magnetic pole position estimating section 407 according to a fifth embodiment. In the fourth embodiment, the difference between the phase angles Ψ and Ψm is calculated and their sum is obtained, and the rotational speed ω is calculated by using the sum. In a fifth embodiment, as shown in FIG. 13, after the sum of a phase angle Ψ and a phase angle Ψm is calculated, the difference is obtained, and a rotational speed ω is calculated based on the difference. Since the other parts of the constitution are the same as those in the fourth embodiment, portions of a difference operation are mainly described below. Similarly to the fourth embodiment, the differential operation may be used instead of the difference operation.

When ω>0, Ψ=θr+π/2−θ and Ψm=θr+π/2−θm=θr++π/2+θ, and thus their sum (Ψ+Ψm) is such that Ψ+Ψm=2θr. When ω<0, similarly Ψ+Ψm=2θr. Therefore, when the difference result in the difference operating section 4117 is expressed as Δ(Ψ+Ψm)=2Δθr=2ωr·T1 by using the time interval T1 regardless of the rotational direction (positive or negative rotation at ω). The ω generating section 4115 multiplies the input difference expressed as Δ(Ψm+Ψ)=2ωr·T1 by 0.5, and further divides the result by the time T1 so as to calculate the rotational speed ω. Also in the fifth embodiment, similarly to the fourth embodiment, the rotational speed ω can be estimated more accurately.

—Sixth Embodiment—

In the first embodiment (FIGS. 6 and 7), the formula of θ is switched between Formulas (4) and (5) according to positive and negative values of a rotational speed ω so that a magnetic pole electrical angle θ is calculated. Further, when the rotational speed ω has the negative value at the start time (reverse rotation), an Id and Iq setting section 402 sets Iq so that Iq>0 and decelerates the rotation. Further, in the second embodiment (FIGS. 8 and 10), a magnetic pole phase shift correcting amount Δφ is calculated using Formula (7) or (8) according to the positive and negative values of the rotational speed ω. When the rotational speed ω has a negative value (the reverse rotation), the magnetic pole phase shift correcting amount Δφ is set as expressed in Formula (8). Further, Iq is set so that Iq>0, and the reverse rotation is decelerated. On the other hand, in the sixth embodiment, when the magnetic pole electrical angle θ is set, the calculation is made in a state that the positive rotation is regarded as being made. When the rotational speed ω at the rotation start time is such that ω<0, Iq in the Id and Iq setting section 402 is set so that Iq<0, and thus the deceleration operation is certainly performed.

The constitution in FIG. 6 is first described. In the first embodiment, the rotational speed ω is fed back to a phase angle arithmetic section 4076, and the magnetic pole electrical angle θ is calculated by Formula (4) or (5) according to the positive and negative values of the rotational speed ω. On the other hand, in the sixth embodiment, the magnetic pole electrical angle θ is calculated by using Formula (4) regardless of the positive and negative values of the rotational speed ω (in this case, the feedback of the rotational speed ω is not necessary). When the rotational speed ω from a rotational speed arithmetic section 4078 is such that ω>0, the Id and Iq setting section 402 sets Iq so that Iq>0 at an acceleration time.

On the other hand, when the rotational speed ω from the rotational speed arithmetic section 4078 is such that ω<0, the Id and Iq setting section 402 sets Iq so that Iq<0. In the sixth embodiment, Iq in the Id and Iq setting section 402 is switched between the positive and negative values according to the positive and negative values of the rotational speed ω, and when ω<0, Iq is always set to Iq<0. For this reason when the rotational direction at the rotation starting time is the reverse rotation, deceleration is certainly carried out. That is to say, the revolution can be prevented from rising in the reverse rotation, and thus the operation can quickly shift to the normal pump activating operation.

The constitution in FIG. 8 is described below. In the sixth embodiment, when the magnetic pole phase shift correcting amount Δφ is set in a rotational speed/magnetic pole position estimating section 407, Formula (7) is used regardless of the rotational direction (the positive and negative values of ω). When the rotational speed ω input from the rotational speed/magnetic pole position estimating section 407 is such that ω<0, the Id and Iq setting section 402 sets Iq so that Iq<0.

In a case where Δφ is set by using Formula (7) regardless of the positive and negative values of ω, even if the Id and Iq setting section 402 sets Iq so that Iq>0, normal acceleration is carried out in the positive rotation, but Iq is set so that Iq>0 in the reverse rotation, acceleration is carried out in the reverse rotation. In a modified example, Δφ is set by using Formula (7) regardless of the positive and negative values of ω, but when the rotational speed ω input from the rotational speed/magnetic pole position estimating section 407 is determined as ω<0, the Id and Iq setting section 402 sets Iq so that Iq<0 contrary to the case of ω>0. In this case, the rotation of a motor rotor 11 in the reverse rotation is decelerated. This control method is not limited to the case of the constitution in FIG. 8, and can also be applied to the constitutions in the third to fifth embodiments.

A motor driving device for a vacuum pump of the present invention includes: an inverter 43 for driving the motor, the inverter 43 having a plurality of switching elements; a rotational speed/magnetic pole position estimating section 407 for calculating the rotational speed ω and the magnetic pole electrical angle θ of a motor rotor based on information about motor phase voltage and information about motor phase current; an Id and Iq setting section 402 for setting a d-axis current command and a q-axis current command in the rotating coordinate dq system based on a difference between the rotational speed ω and the target rotational speed ωi; a drive command generating section (an equivalent circuit voltage converting section 403, a dq to two-phase voltage converting section 404, and a two-phase to three-phase voltage converting section 405) for generating a sinusoidal wave driving command based on the d-axis current command Id, the q-axis current command Iq, the rotational speed ω and the magnetic pole electrical angle θ; and a PWM signal generating section 406 for generating a PWM control signal for controlling an on/off state of a plurality of switching elements SW1 to SW6 based on the sinusoidal wave driving command, wherein when the rotational speed ω has a positive value indicating a positive rotational state at a pump activating time, the Id and Iq setting section 402 sets the q-axis current command for acceleration driving, and when the rotational speed ω has a negative value indicating a reverse rotational state, the Id and Iq setting section 402 sets the q-axis current command for deceleration driving. The process in the Id and Iq setting section 402 provided conventionally is changed, so that when the motor reversely rotates, it is decelerated, and the process can quickly shift to the normal pump activating operation.

Further, as shown in FIG. 8, the rotational speed/magnetic pole position estimating section 407 includes: a counter electromotive voltage arithmetic section 4074 for calculating counter electromotive voltages (Eα and Eβ) in a fixed coordinate αβ system based on information about motor phase voltage and information about motor phase current; a converting section 4075 for inputting the magnetic pole electrical angle θ through feedback and converting the counter electromotive voltages (Eα and Eβ) into counter electromotive voltages (Ed and Eq) in the rotating coordinate dq system based on the magnetic pole electrical angle θ; a correcting amount Δφ arithmetic section 4077 for, when vector phase angles of the counter electromotive voltages (Ed and Eq) are denoted by Ψ and the rotational speed ω has a positive value, calculating the magnetic pole phase shift correcting amount Δφ so that Ψ−π/2 converges to 0, and when the rotational speed ω has a negative value, calculating the magnetic pole phase shift correcting amount Δφ so that Ψ+π/2 converges to 0; a rotational speed arithmetic section 4078 for calculating the rotational speed ω based on the counter electromotive voltages (Eα and Eβ); and an integration operating section 4079 for calculating an integrated value ∫ωdt of the rotational speed ω calculated by the rotational speed arithmetic section 4078.

In the case of the rotational speed ω having the negative value, the Id and Iq setting section 402 sets the q-axis current command Iq to the positive value. Instead of the change in the process in the Id and Iq setting section 402 provided conventionally, the process in the correcting amount Δφ arithmetic section 4077 is switched by a sign of the rotational speed ω, so that deceleration is carried out when the motor reversely rotates, and the process quickly shifts to the normal pump activating operation.

Further, the rotational speed/magnetic pole position estimating section 407 calculates the rotational speed ω and the magnetic pole electrical angle θ independently, and outputs a sum of a magnetic pole phase error Δφ and an integrated value ∫ωdt as the magnetic pole electrical angle θ. For this reason, calculation accuracy of the rotational speed ω and the magnetic pole electrical angle θ can be improved. As a result, drive stability can be improved in sensorless sine wave drive.

In the constitution of the rotational speed arithmetic section 4078, as shown in FIG. 9, the rotational speed ω may be calculated based on a vector component phase θ1 of the counter electromotive voltages (Eα and Eβ) calculated by the counter electromotive voltage arithmetic section 4074.

Further, like the constitution shown in FIG. 12 and FIG. 13, the rotational speed ω is calculated based on a vector component phase Ψ of the counter electromotive voltages (Ed and Eq) converted by using the magnetic pole electrical angle θ and a vector component phase Ψm of the counter electromotive voltage (Emd and Emq) converted by using the magnetic pole electrical angle Θm=−θ, so that the calculation accuracy of the rotational speed ω can be improved. In the constitution shown in FIG. 12, the rotational speed ω is calculated based on an average value between a difference value ΔΨ of vector component phases Ψ of the counter electromotive voltages (Ed and Eq) obtained at a predetermined time interval T1, and a difference value ΔΨm of vector component phases Ψm of the counter electromotive voltages (Emd and Emq) obtained at the predetermined time interval T1. In the constitution shown in FIG. 13, the average value between the vector component phase Ψ of the second counter electromotive voltages (Ed and Eq) and the vector component phase Ψm of the counter electromotive voltages (Emd and Emq) is obtained at the predetermined time interval T1, and the rotational speed ω is calculated based on the difference value of the obtained average value.

Also in the constitution shown in FIG. 11, the steady-state error of the rotational speed ω can be reduced. In the rotational speed/magnetic pole position estimating section 407 shown in FIG. 11, the rotational speed arithmetic section 4078 converts the counter electromotive voltages (Eα and Eβ) into the counter electromotive voltages (E1d and E1q) in the rotating coordinate dq system based on an electrical angle θ2 obtained by integrating the rotational speed ω, and calculates the rotational speed ω based on the vector component phase Ψ1 of the counter electromotive voltages (E1d and E1q).

Further, as shown in FIG. 6, the counter electromotive voltage components Eα and Eβ in the fixed coordinate αβ system are calculated based on the information about the motor phase voltage and the information about the motor phase current. When the rotational speed ω fed back to be input from the rotational speed arithmetic section 4078 has a positive value, the magnetic pole electrical angle is calculated by θ=tan$^{-1}$(−Eα/Eβ). When the rotational speed ω that is fed back to be input has a negative value, the magnetic pole electrical angle may be calculated according to θ=tan$^{-1}$(Eα/−Eβ). When the rotational speed ω has a negative value, the q-axis current command is set to a positive value so that deceleration drive is carried out.

In another manner, the magnetic pole electrical angle θ is calculated by θ=tan$^{-1}$ (−Eα/Eβ), and the rotational speed ω is calculated based on the calculated magnetic pole electrical angle θ. When the rotational speed ω has a negative value, the q-axis current command may be set to a negative value. In any case, when the motor reversely rotates at the activating time, the motor is decelerated and the pump can immediately shift to the normal pump activating operation.

In the calculation of the magnetic pole phase shift correcting amount Δφ, for example, when ω>0 and the phase angle Ψ shifts greatly from π/2(rad) (for example, Ψ<0), Formulas (7) and (8) are not used and Δφ may be calculated as a comparatively large value (for example, π/2) in order to improve convergence.

Further, in the generation of the magnetic pole rotational angle θ, it is assumed that the rotational speed ω approximately converges to the actual rotational speed (matches). Therefore, when the estimated rotational speed greatly deviates from the actual rotational speed and an absolute value of ΔΨ1 in Formula (13) is larger than a predetermined threshold, the magnetic pole phase shift correcting amount Δφ may be forcibly set to be zero in order to improve magnetic pole position convergence.

In the above embodiments, the motor current detection and the motor voltage detection in the case of the three phase inputs are described but only two phase inputs are used and one phase input may be calculated based on the two phase inputs. For example, when W phase is calculated, the calculation is made as Iw=−Iu−Iv and Vw=−Vu−Vv.

The above description is only one example, and thus the present invention is not limited to the above embodiments as long as the characteristics of the present invention are not impaired. For example, the present invention can be applied not only to the case of a two-pole motor but also to a multi-pole motor such as a four-pole motor by replacing the electrical angle with one coping with the multi-pole. Further, the above embodiments describe a turbo molecular pump having a turbo pump stage and a drag pump stage as an example, but the present invention can be similarly applied to any vacuum pump in which a rotor is driven to be rotated by a motor. The above embodiments may be used individually or may be combined with each other. This is because the embodiments can produce the effects, respectively, or produce a synergy effect.

What is claimed is:

1. A motor driving device for a vacuum pump comprising:
   an inverter for driving a motor using only a positive rotation, the inverter having a plurality of switching elements;
   a first arithmetic section for calculating a rotational speed and a magnetic pole electrical angle of a motor rotor based on information about motor phase voltage and information about motor phase current;
   a current command setting section for setting a d-axis current command and a q-axis current command in a rotating coordinate dq system based on a difference between the rotational speed and a target rotational speed;
   a driving command generating section for generating a sinusoidal wave driving command based on the d-axis current command, the q-axis current command, the rotational speed and the magnetic pole electrical angle; and
   a PWM signal generating section for generating a PWM control signal for controlling on/off of the plurality of switching elements based on the sinusoidal wave driving command,
   wherein, when the rotation of the motor rotor is started, the q-axis current command is set such that a torque is always generated in the positive rotational direction, in order that if the rotational speed has a positive value indicating a positive rotational state, the current command setting section sets the q-axis current command of acceleration driving, so that the rotation of the motor rotor that rotates in the positive direction is accelerated, and if the rotational speed has a negative value indicating a reverse rotational state, the current command setting section sets the q-axis current command of deceleration driving, so that the rotation of the motor rotor that rotates in the reverse direction is decelerated to stop and thereafter the motor rotor starts to rotate in the positive direction,
   wherein
   the first arithmetic section includes
      a counter electromotive voltage arithmetic section for calculating a first counter electromotive voltage in a fixed coordinate αβ system based on the information about the motor phase voltage and the information about the motor phase current,
      a first converting section for receiving the magnetic pole electrical angle through feedback and converting the first counter electromotive voltage into a second counter electromotive voltage in the rotating coordinate dq system based on the magnetic pole electrical angle,
      a second arithmetic section for, when a vector phase angle of the second counter electromotive voltage is denoted by Ψ and the rotational speed has a positive value, calculating a magnetic pole phase error so that Ψ−π/2 converges to 0, and when the rotational speed has a negative value, calculating the magnetic pole phase error so that Ψ+π/2 converges to 0,
      a third arithmetic section for calculating the rotational speed based on the first counter electromotive voltage, and
      a fourth arithmetic section for calculating an integrated value of the rotational speed calculated by the third arithmetic section,
   the first arithmetic section outputs a sum of the magnetic pole phase error and the integrated value as the magnetic pole electrical angle, and
   when the rotational speed has a negative value, the current command setting section sets the q-axis current command to a positive value so as to carry out deceleration driving.

2. A motor driving device for a vacuum pump comprising:
   an inverter for driving a motor using only a positive rotation, the inverter having a plurality of switching elements;
   a first arithmetic section for calculating a rotational speed and a magnetic pole electrical angle of a motor rotor based on information about motor phase voltage and information about motor phase current;
   a current command setting section for setting a d-axis current command and a q-axis current command in a rotating coordinate dq system based on a difference between the rotational speed and a target rotational speed;
   a driving command generating section for generating a sinusoidal wave driving command based on the d-axis current command, the q-axis current command, the rotational speed and the magnetic pole electrical angle; and
   a PWM signal generating section for generating a PWM control signal for controlling on/off of the plurality of switching elements based on the sinusoidal wave driving command,
   wherein, when the rotation of the motor rotor is started, the q-axis current command is set such that a torque is always generated in the positive rotational direction, in order that if the rotational speed has a positive value indicating a positive rotational state, the current command setting section sets the q-axis current command of acceleration driving, so that the rotation of the motor rotor that rotates in the positive direction is accelerated, and if the rotational speed has a negative value indicating a reverse rotational state, the current command setting section sets the q-axis current command of deceleration driving, so that the rotation of the motor rotor that rotates in the reverse direction is decelerated to stop and thereafter the motor rotor starts to rotate in the positive direction,
   wherein
   the first arithmetic section includes
      a counter electromotive voltage arithmetic section for calculating a first counter electromotive voltage in a fixed coordinate αβ system based on the information about the motor phase voltage and the information about the motor phase current, a first converting section for receiving the magnetic pole electrical angle through feedback and converting the first counter electromotive voltage into a second counter electromotive voltage in the rotating coordinate dq system based on the magnetic pole electrical angle, a second arithmetic section for, when a vector phase angle of the second counter electromotive voltage is denoted by $\Psi$, calculating a magnetic pole phase error so that $\Psi-\pi/2$ converges to 0, a third arithmetic section for calculating the rotational speed based on the first counter electromotive voltage, and a fourth arithmetic section for calculating an integrated value of the rotational speed calculated by the third arithmetic section, the first arithmetic section outputs a sum of the magnetic pole phase error and the integrated value as the magnetic pole electrical angle, and when the rotational speed has a negative value, the current command setting section sets the q-axis current command to a negative value so as to carry out deceleration driving.

3. The motor driving device for a vacuum pump according to claim 1, wherein the third arithmetic section includes a second converting section for receiving an electric angle calculated by sign-inverting the sum through feedback and converting the first counter electromotive voltage into a third counter electromotive voltage in the rotating coordinate dq system based on the electric angle, and a rotational speed arithmetic section for calculating the rotational speed based on a vector component phase of the second counter electromotive voltage and a vector component phase of the third counter electromotive voltage.

4. The motor driving device for a vacuum pump according to claim 3, wherein the rotational speed arithmetic section calculates the rotational speed based on an average value between a difference value of the vector component phase of the second counter electromotive voltage obtained at predetermined time intervals and a difference value of the vector component phase of the third counter electromotive voltage obtained at the predetermined time intervals.

5. The motor driving device for a vacuum pump according to claim 3, wherein the rotational speed arithmetic section obtains an average value between the vector component phase of the second counter electromotive voltage and the vector component phase of the third counter electromotive voltage at predetermined time intervals, and calculates the rotational speed based on a difference value between the average values obtained at the predetermined time intervals.

6. The motor driving device for a vacuum pump according to claim 1, wherein the third arithmetic section includes a third converting section for receiving an electric angle obtained by integrating the rotational speed through feedback and converting the first counter electromotive voltage into a fourth counter electromotive voltage in the rotating coordinate dq system based on the integrated value electrical angle, and the third arithmetic section calculates the rotational speed based on the vector component phase of the fourth counter electromotive voltage.

7. The motor driving device for a vacuum pump according to claim 1, wherein the third arithmetic section calculates the rotational speed based on the vector component phase of the first counter electromotive voltage calculated by the counter electromotive voltage arithmetic section.

8. A motor driving device for a vacuum pump comprising:

an inverter for driving a motor using only a positive rotation, the inverter having a plurality of switching elements;

a first arithmetic section for calculating a rotational speed and a magnetic pole electrical angle of a motor rotor based on information about motor phase voltage and information about motor phase current;

a current command setting section for setting a d-axis current command and a q-axis current command in a rotating coordinate dq system based on a difference between the rotational speed and a target rotational speed;

a driving command generating section for generating a sinusoidal wave driving command based on the d-axis current command, the q-axis current command, the rotational speed and the magnetic pole electrical angle; and a PWM signal generating section for generating a PWM control signal for controlling on/off of the plurality of switching elements based on the sinusoidal wave driving command, wherein, when the rotation of the motor rotor is started, the q-axis current command is set such that a torque is always generated in the positive rotational direction, in order that if the rotational speed has a positive value indicating a positive rotational state, the current command setting section sets the q-axis current command of acceleration driving, so that the rotation of the motor rotor that rotates in the positive direction is accelerated, and if the rotational speed has a negative value indicating a reverse rotational state, the current command setting section sets the q-axis current command of deceleration driving, so that the rotation of the motor rotor that rotates in the reverse direction is decelerated to stop and thereafter the motor rotor starts to rotate in the positive direction, wherein the first arithmetic section includes a counter electromotive voltage arithmetic section for calculating counter electromotive voltage components $E\alpha$ and $E\beta$ in the fixed coordinate $\alpha\beta$ system based on the information about the motor phase voltage and the information about the motor phase current, a magnetic pole electrical angle arithmetic section for calculating the magnetic pole electrical angle based on the counter electromotive voltage components $E\alpha$ and $E\beta$, and a rotational speed arithmetic section for calculating the rotational speed based on the magnetic pole electrical angle calculated by the magnetic pole electrical angle arithmetic section, when the magnetic pole electrical angle is denoted by $\theta$ and the rotational speed fed back to be input from the rotational speed arithmetic section has a positive value, the magnetic pole electrical angle arithmetic section calculates the magnetic pole electrical angle according to θ=tan$^{-1}$(−Eα/Eβ), and when the rotational speed fed back to be input from the rotational speed arithmetic section has a negative value, the magnetic pole electrical angle arithmetic section calculates the magnetic pole electrical angle according to θ=tan$^{-1}$(Eα/Eβ), and when the rotational speed has a negative value, the current command setting section sets the q-axis current command to a positive value so as to carry out deceleration driving.

9. A motor driving device for a vacuum pump comprising:
an inverter for driving a motor using only a positive rotation, the inverter having a plurality of switching elements;
a first arithmetic section for calculating a rotational speed and a magnetic pole electrical angle of a motor rotor based on information about motor phase voltage and information about motor phase current;
a current command setting section for setting a d-axis current command and a q-axis current command in a rotating coordinate dg system based on a difference between the rotational speed and a target rotational speed;
a driving command generating section for generating a sinusoidal wave driving command based on the d-axis current command, the q-axis current command, the rotational speed and the magnetic pole electrical angle; and
a PWM signal generating section for generating a PWM control signal for controlling on/off of the plurality of switching elements based on the sinusoidal wave driving command,
wherein, when the rotation of the motor rotor is started, the q-axis current command is set such that a torque is always generated in the positive rotational direction, in order that if the rotational speed has a positive value indicating a positive rotational state, the current command setting section sets the q-axis current command of acceleration driving, so that the rotation of the motor rotor that rotates in the positive direction is accelerated, and if the rotational speed has a negative value indicating a reverse rotational state, the current command setting section sets the q-axis current command of deceleration driving, so that the rotation of the motor rotor that rotates in the reverse direction is decelerated to stop and thereafter the motor rotor starts to rotate in the positive direction,
wherein
the first arithmetic section includes
a counter electromotive voltage arithmetic section for calculating counter electromotive voltage components Eα and Eβ in the fixed coordinate αβ system based on the information about the motor phase voltage and the information about the motor phase current,
a magnetic pole electrical angle arithmetic section for, when the magnetic pole electrical angle is denoted by θ, calculating the magnetic pole electrical angle according to θ=tan$^{-1}$(−Eα/Eβ), and
a rotational speed arithmetic section for calculating the rotational speed based on the magnetic pole electrical angle calculated by the magnetic pole electrical angle arithmetic section, and when the rotational speed has a negative value, the current command setting section sets the q-axis current command to a negative value so as to carry out deceleration driving.

10. A vacuum pump comprising:
a pump rotor formed with an exhaust function section;
a motor for driving to rotate the pump rotor; and
the motor driving device for a vacuum pump according to claim 1 for driving the motor.

11. The motor driving device for a vacuum pump according to claim 2, wherein
the third arithmetic section includes
a second converting section for receiving an electric angle calculated by sign-inverting the sum through feedback and converting the first counter electromotive voltage into a third counter electromotive voltage in the rotating coordinate dq system based on the electric angle, and
a rotational speed arithmetic section for calculating the rotational speed based on a vector component phase of the second counter electromotive voltage and a vector component phase of the third counter electromotive voltage.

12. The motor driving device for a vacuum pump according to claim 11, wherein
the rotational speed arithmetic section calculates the rotational speed based on an average value between a difference value of the vector component phase of the second counter electromotive voltage obtained at predetermined time intervals and a difference value of the vector component phase of the third counter electromotive voltage obtained at the predetermined time intervals.

13. The motor driving device for a vacuum pump according to claim 11, wherein
the rotational speed arithmetic section obtains an average value between the vector component phase of the second counter electromotive voltage and the vector component phase of the third counter electromotive voltage at predetermined time intervals, and calculates the rotational speed based on a difference value between the average values obtained at the predetermined time intervals.

14. The motor driving device for a vacuum pump according to claim 2, wherein
the third arithmetic section includes a third converting section for receiving an electric angle obtained by integrating the rotational speed through feedback and converting the first counter electromotive voltage into a fourth counter electromotive voltage in the rotating coordinate dq system based on the integrated value electrical angle, and
the third arithmetic section calculates the rotational speed based on the vector component phase of the fourth counter electromotive voltage.

15. The motor driving device for a vacuum pump according to claim 2, wherein
the third arithmetic section calculates the rotational speed based on the vector component phase of the first counter electromotive voltage calculated by the counter electromotive voltage arithmetic section.

* * * * *